US012610294B2

(12) United States Patent (10) Patent No.: US 12,610,294 B2

Xie et al. (45) Date of Patent: Apr. 21, 2026

(54) TRANSMISSION PARAMETER OBTAINING METHOD, APPARATUS, AND SYSTEM

(71) Applicant: HUAWEI TECHNOLOGIES CO., LTD., Shenzhen (CN)

(72) Inventors: Zonghui Xie, Shenzhen (CN); Hong Wang, Beijing (CN); Lei Chen, Beijing (CN); Bingzhao Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 515 days.

(21) Appl. No.: 18/172,505

(22) Filed: Feb. 22, 2023

(65) Prior Publication Data

US 2023/0209420 A1 Jun. 29, 2023

Related U.S. Application Data

(63) Continuation of application No. PCT/CN2021/114267, filed on Aug. 24, 2021.

(30) Foreign Application Priority Data

Aug. 27, 2020 (CN) .......................... 202010881389.0

(51) Int. Cl.
  *H04W 36/00* (2009.01)
  *H04W 36/24* (2009.01)
  *H04W 36/30* (2009.01)
(52) U.S. Cl.
  CPC ....... *H04W 36/0085* (2018.08); *H04W 36/24* (2013.01); *H04W 36/305* (2018.08)
(58) Field of Classification Search
  CPC ............. H04W 36/0085; H04W 36/24; H04W 36/305; H04W 24/02; H04W 36/32;
  (Continued)

(56) References Cited

U.S. PATENT DOCUMENTS

2021/0068013 A1* 3/2021 Cheng ................... H04W 48/18
2021/0212014 A1* 7/2021 Gao ...................... H04W 48/12
(Continued)

FOREIGN PATENT DOCUMENTS

CN 105517170 A 4/2016
CN 110351787 A 10/2019
(Continued)

OTHER PUBLICATIONS

CATT, "CR on measurement relaxation in IDLE mode for UE power saving", 3GPP TSG-RAN4 Meeting #94-e, R4-2002326 (Year: 2020).*

(Continued)

*Primary Examiner* — Phirin Sam
*Assistant Examiner* — Mang Boi Thawng
(74) *Attorney, Agent, or Firm* — HAUPTMAN HAM, LLP

(57) ABSTRACT

A transmission parameter obtaining method includes obtaining, by a terminal device, a transmission parameter of a network device, wherein the transmission parameter indicates location information of the network device. The method also includes determining, by the terminal device, at least one of an intra-frequency cell-reselection measurement threshold or an inter-frequency cell-reselection measurement threshold based on the transmission parameter. The method further includes determining, by the terminal device, a radio link failure threshold based on the transmission parameter. The method additionally includes determining, by the terminal device, at least one of an intra-frequency connected-state measurement threshold or an inter-frequency connected-state measurement threshold based on the transmission parameter.

16 Claims, 7 Drawing Sheets

A terminal device obtains a transmission parameter of a network device ⟋ 301

The terminal device determines an intra-frequency and/or inter-frequency cell-reselection measurement threshold based on the transmission parameter ⟋ 302

The terminal device determines, based on the intra-frequency and/or inter-frequency cell-reselection measurement threshold, whether to trigger intra-frequency and/or inter-frequency cell-reselection measurement ⟋ 303

(58) Field of Classification Search
CPC ..... H04W 48/18; H04W 48/20; H04W 84/06; H04W 36/0083; H04W 36/04
See application file for complete search history.

(56) References Cited

U.S. PATENT DOCUMENTS

| | | | | |
|---|---|---|---|---|
| 2022/0377625 | A1* | 11/2022 | Li | ..................... H04W 36/0058 |
| 2022/0386202 | A1* | 12/2022 | You | ....................... H04W 84/06 |
| 2023/0007523 | A1* | 1/2023 | Fu | ..................... H04B 7/18504 |
| 2023/0089127 | A1* | 3/2023 | Dong | ................. H04W 36/326 |
| | | | | 455/440 |
| 2023/0125129 | A1* | 4/2023 | You | ....................... H04W 48/20 |
| | | | | 455/422.1 |
| 2023/0209426 | A1* | 6/2023 | Fu | ..................... H04W 36/0061 |
| | | | | 370/331 |
| 2023/0308980 | A1* | 9/2023 | Rune | ................. H04B 7/18541 |

FOREIGN PATENT DOCUMENTS

| | | |
|---|---|---|
| CN | 110830101 A | 2/2020 |
| CN | 110839254 A | 2/2020 |
| CN | 110972257 A | 4/2020 |
| CN | 111246596 A | 6/2020 |
| CN | 111294801 A | 6/2020 |
| EP | 3700257 A1 | 8/2020 |
| WO | 2020148582 A1 | 7/2020 |

OTHER PUBLICATIONS

Interdigital, "Conditional measurement configuration for LEO NTN", 3GPP RAN WG2 Meeting #107bis, R2-1913603 (Year: 2019).*
Ericsson, "Cell selection/reselection for NTN GEO and LEO", 3GPP TSG-RAN WG2 #107, Tdoc R2-1910543 (Year: 2019).*
ZTE Corporation, Sanechips, "Consideration on the cell definition and NTN mobility", 3GPP TSG-RAN WG2 Meeting#104, R2-1817062 (Year: 2018).*
Intel Corporation, Mobility enhancement for NTN. 3GPP TSG-RAN WG2 Meeting #111, E-Meeting, USA, Aug. 17-28, 2020, R2-2006930, 4 pages.
Extended European Search Report issued in corresponding European Application No. 21860367.8, dated Dec. 20, 2023, pp. 1-12.
3GPP TR 38.821 V16.0.0 (Dec. 2019), 3rd Generation Partnership Project; Technical Specification Group Radio Access Network; Solutions for NR to support non-terrestrial networks (NTN(Release 16), 140 pages.
3GPP TS 36.133 V16.6.0 (Jun. 2020), 3rd Generation Partnership Project; Technical Specification Group Radio Access Network; Evolved Universal Terrestrial Radio Access (E-UTRA); Requirements for support of radio resource management(Release 16), 3731 pages.

* cited by examiner

Network device

UL

UL

Terminal
device 3

Terminal device 2

Terminal device 1

Terminal
device

Flight
platform

Access
network
device

Core
network
device

Data network

Terminal
device

Flight
platform

Access
network
device–DU

Access network
device–CU

Core
network
device

Data
network

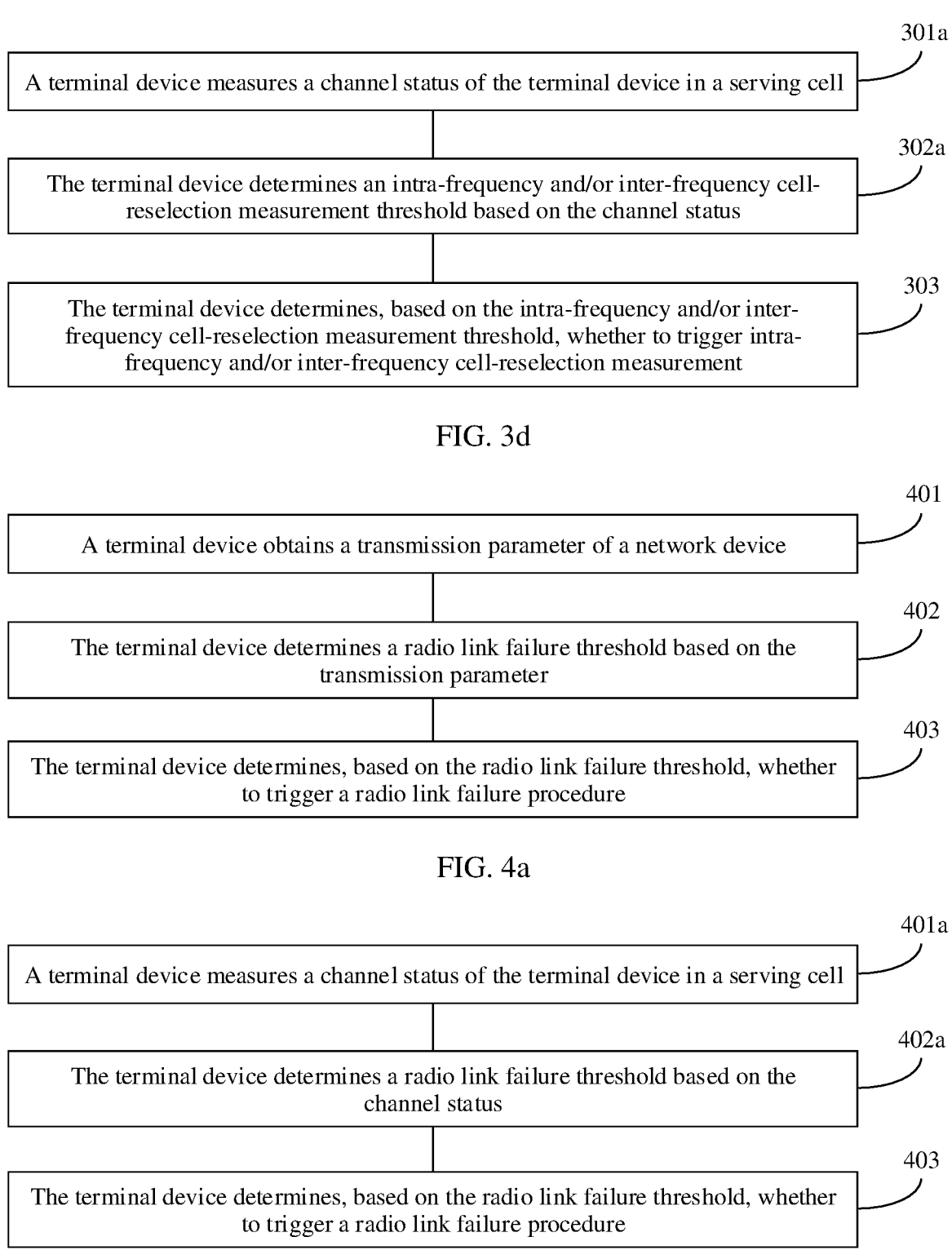

301a

A terminal device measures a channel status of the terminal device in a serving cell 302a The terminal device determines an intra-frequency and/or inter-frequency cell-reselection measurement threshold based on the channel status

303

The terminal device determines, based on the intra-frequency and/or inter-frequency cell-reselection measurement threshold, whether to trigger intra-frequency and/or inter-frequency cell-reselection measurement

A terminal device obtains a transmission parameter of a network device

402

The terminal device determines a radio link failure threshold based on the transmission parameter

403

The terminal device determines, based on the radio link failure threshold, whether to trigger a radio link failure procedure

A terminal device measures a channel status of the terminal device in a serving cell 402a The terminal device determines a radio link failure threshold based on the channel status

403

The terminal device determines, based on the radio link failure threshold, whether to trigger a radio link failure procedure

FIG. 4b

TRANSMISSION PARAMETER OBTAINING METHOD, APPARATUS, AND SYSTEM

CROSS-REFERENCE TO RELATED APPLICATIONS

This application is a continuation of International Application No. PCT/CN2021/114267, filed on Aug. 24, 2021, which claims priority to Chinese Patent Application No. 202010881389.0, filed on Aug. 27, 2020. The disclosures of the aforementioned applications are hereby incorporated by reference in their entireties.

TECHNICAL FIELD

The present application relates to the field of communication technologies, and in particular, to a transmission parameter obtaining method, an apparatus, and a system.

BACKGROUND

In an existing communication system, a terminal device performs mobility management based on a cell reselection procedure, a cell handover procedure, and a radio link failure recovery procedure. When the terminal device is in an idle mode, the terminal device may trigger measurement based on a cell priority of a cell that currently provides a service (serving cell for short), a cell priority of a neighboring cell, and a cell-reselection measurement threshold, to perform cell reselection. When the terminal device is in a connected mode, the terminal device may trigger measurement based on a channel status of the serving cell and a connected-state measurement threshold, to perform cell handover. The terminal device may further trigger a radio link failure recovery procedure based on the channel status of the serving cell and a radio link failure threshold, to recover a connection to the serving cell or establish a connection to a new cell.

A non-terrestrial network (non-terrestrial network, NTN) is introduced in a place where a base station cannot be deployed, such as a sea, a desert, or the air. A base station or some base station functions are deployed on a flight platform such as a satellite, to provide seamless coverage for a terminal device, to improve reliability of a communication system.

However, compared with a terrestrial network (terrestrial network, TN), because a satellite keeps moving, when a distance between the satellite and a terminal device keeps changing, a channel status corresponding to the terminal device changes more sharply, and a procedure such as cell reselection or cell handover is affected, thereby reducing reliability of a communication system.

SUMMARY

In view of this, an objective of this application is to provide a transmission parameter obtaining method, an apparatus, and a system, to help improve reliability of a communication system.

According to a first aspect, an embodiment of this application provides a transmission parameter obtaining method, where the method includes: obtaining, by a terminal device, a transmission parameter of a network device, where the transmission parameter indicates location information of the network device; and determining, by the terminal device, an intra-frequency and/or inter-frequency cell-reselection measurement threshold based on the transmission parameter;

determining, by the terminal device, a radio link failure threshold based on the transmission parameter; or determining, by the terminal device, an intra-frequency and/or inter-frequency connected-state measurement threshold based on the transmission parameter.

Based on the first aspect, the terminal device may dynamically determine, based on the location information of the network device, the intra-frequency and/or inter-frequency cell-reselection measurement threshold, the radio link failure threshold, or the intra-frequency and/or inter-frequency connected-state measurement threshold. The terminal device properly uses different thresholds when the network device is in different locations, so that the terminal device can be prevented from triggering intra-frequency and/or inter-frequency cell-reselection measurement or intra-frequency and/or inter-frequency connected-state measurement excessively early or excessively late or detecting a radio link detection failure. This improves reliability of a communication system and facilitates energy saving of the terminal device.

In a possible design, the transmission parameter includes a distance between the terminal device and the network device, and the determining, by the terminal device, an intra-frequency and/or inter-frequency cell-reselection measurement threshold based on the transmission parameter includes: when a variation of the distance in a unit time is less than or equal to a first value, using, by the terminal device, a first threshold as the intra-frequency and/or inter-frequency cell-reselection measurement threshold; or when the variation of the distance in the unit time is greater than the first value, using, by the terminal device, a second threshold as the intra-frequency and/or inter-frequency cell-reselection measurement threshold, where the first threshold is less than the second threshold.

Based on this possible design, the terminal device may use, when the distance between the terminal device and the network device becomes shorter, the first threshold that is smaller as the intra-frequency and/or inter-frequency cell-reselection measurement threshold, to prevent the terminal device from triggering intra-frequency and/or inter-frequency cell-reselection measurement excessively early, thereby facilitating energy saving of the terminal device. When the distance between the terminal device and the network device becomes longer, the second threshold that is larger is used as the intra-frequency and/or inter-frequency cell-reselection measurement threshold, to prevent the terminal device from triggering intra-frequency and/or inter-frequency cell-reselection measurement excessively late, thereby improving reliability of the communication system.

In a possible design, the transmission parameter includes a height angle of the network device relative to a center of a serving cell corresponding to the terminal device, and the determining, by the terminal device, an intra-frequency and/or inter-frequency cell-reselection measurement threshold based on the transmission parameter includes: determining, by the terminal device based on the height angle from a mapping relationship between a height angle and an intra-frequency and/or inter-frequency cell-reselection measurement threshold, an intra-frequency and/or inter-frequency cell-reselection measurement threshold corresponding to the height angle.

Based on this possible design, as the height angle between the network device and the center of the serving cell constantly changes, a channel status of the terminal device constantly changes. The terminal device uses different intra-frequency and/or inter-frequency cell-reselection measurement thresholds at different height angles, so that the terminal device can be prevented from triggering intra-frequency and/or inter-frequency cell-reselection measurement excessively early or excessively late, thereby improving reliability of the communication system and facilitating energy saving of the terminal device.

In a possible design, the transmission parameter includes the distance between the terminal device and the network device, and the determining, by the terminal device, a radio link failure threshold based on the transmission parameter includes: when the variation of the distance in the unit time is less than or equal to a second value, using, by the terminal device, a third threshold as the radio link failure threshold; or when the variation of the distance in the unit time is greater than the second value, using, by the terminal device, a fourth threshold as the radio link failure threshold, where the third threshold is greater than the fourth threshold.

Based on this possible design, when the distance between the terminal device and the network device becomes shorter, the terminal device may use the third threshold that is larger as the radio link failure threshold, to prevent the terminal device from triggering a radio link failure recovery procedure excessively early, thereby facilitating energy saving of the terminal device. When the distance between the terminal device and the network device becomes longer, the terminal device uses the fourth threshold that is smaller as the radio link failure threshold, to prevent the terminal device from triggering the radio link failure recovery procedure excessively late, thereby improving reliability of the communication system.

In a possible design, when the transmission parameter includes the height angle of the network device relative to the center of the serving cell corresponding to the terminal device, the determining, by the terminal device, an intra-frequency and/or inter-frequency connected-state measurement threshold based on the transmission parameter includes: determining, by the terminal device based on the height angle from a mapping relationship between a height angle and an intra-frequency and/or inter-frequency connected-state measurement threshold, an intra-frequency and/or inter-frequency connected-state measurement threshold corresponding to the height angle.

Based on this possible design, as the height angle between the network device and the center of the serving cell constantly changes, a channel status of the terminal device constantly changes. The terminal device uses different intra-frequency and/or inter-frequency connected-state measurement thresholds at different height angles, so that the terminal device can be prevented from triggering intra-frequency and/or inter-frequency connected-state measurement excessively early or excessively late, thereby improving reliability of the communication system and facilitating energy saving of the terminal device.

In a possible design, the terminal device periodically updates the intra-frequency and/or inter-frequency cell-reselection measurement threshold, the radio link failure threshold, or the intra-frequency and/or inter-frequency connected-state measurement threshold.

Based on the possible design, the terminal device periodically updates the intra-frequency and/or inter-frequency cell-reselection measurement threshold, the radio link failure threshold, or the intra-frequency and/or inter-frequency connected-state measurement threshold, so that the terminal device can properly adjust the threshold in a communication process, thereby improving reliability of the communication system and facilitating energy saving of the terminal device.

In a possible design, when the terminal device determines that the terminal device is located at an edge of the serving cell, the terminal device performs intra-frequency and/or inter-frequency cell-reselection measurement; or the terminal device performs intra-frequency connected-state measurement.

Based on this possible design, when the terminal device is located at the edge of the serving cell, the terminal device may trigger intra-frequency and/or inter-frequency cell-reselection measurement or trigger intra-frequency connected-state measurement, to avoid unnecessary power consumption caused because no suitable neighboring cell is found when the terminal device starts intra-frequency and/or inter-frequency cell-reselection measurement or intra-frequency connected-state measurement at the center of the serving cell, thereby facilitating energy saving of the terminal device. In addition, a quantity of times that the terminal device triggers intra-frequency and/or inter-frequency cell-reselection measurement or intra-frequency connected-state measurement can be reduced, thereby improving flexibility of intra-frequency and/or inter-frequency cell-reselection measurement or intra-frequency connected-state measurement, and improving efficiency of intra-frequency and/or inter-frequency cell-reselection measurement or intra-frequency connected-state measurement.

In a possible design, when the terminal device determines that a distance between the network device and the center of the serving cell is the shortest, the terminal device performs intra-frequency and/or inter-frequency cell-reselection measurement based on the intra-frequency and/or inter-frequency cell-reselection measurement threshold.

Based on this possible design, when the distance between the network device and the center of the serving cell is the shortest, the terminal device may determine, based on the intra-frequency and/or inter-frequency cell-reselection measurement threshold, whether to trigger intra-frequency and/or inter-frequency cell-reselection measurement, thereby reducing a quantity of times that the terminal device triggers intra-frequency and/or inter-frequency cell-reselection measurement, and improving flexibility of intra-frequency and/or inter-frequency cell-reselection measurement efficiency.

In a possible design, the terminal device determines, based on indication information sent by the network device based on a location of the terminal device in the serving cell, whether to trigger intra-frequency and/or inter-frequency connected-state measurement. When the indication information indicates to trigger intra-frequency and/or inter-frequency connected-state measurement, the terminal device performs intra-frequency and/or inter-frequency connected-state measurement based on the intra-frequency and/or inter-frequency connected-state measurement threshold.

Based on this possible design, when the terminal device is located at the edge of the serving cell, the network device may indicate the terminal device to trigger intra-frequency and/or inter-frequency connected-state measurement based on the intra-frequency and/or inter-frequency connected-state measurement threshold, to avoid unnecessary power consumption caused because no suitable neighboring cell is found when the terminal device starts intra-frequency and/or inter-frequency connected-state measurement at the center of the serving cell, thereby facilitating energy saving of the terminal device. In addition, a quantity of times that the terminal device triggers intra-frequency and/or inter-frequency connected-state measurement can be reduced, thereby improving flexibility of intra-frequency and/or inter-frequency connected-state measurement, and improving efficiency of intra-frequency and/or inter-frequency connected-state measurement.

According to a second aspect, a terminal device is provided. The terminal device may implement functions performed by the terminal device in the first aspect or the possible designs of the first aspect, and the functions may be implemented by hardware by executing corresponding software. The hardware or the software includes one or more modules corresponding to the functions, for example, a receiving module and a processing module. The receiving module is configured to obtain a transmission parameter of a network device, where the transmission parameter indicates location information of the network device. The processing module is configured to determine an intra-frequency and/or inter-frequency cell-reselection measurement threshold based on the transmission parameter. Alternatively, the processing module is configured to determine a radio link failure threshold based on the transmission parameter; or the processing module is configured to determine an intra-frequency and/or inter-frequency connected-state measurement threshold based on the transmission parameter.

For a specific implementation of the terminal device, refer to behavior functions of the terminal device in the transmission parameter obtaining method according to any one of the first aspect or the possible designs of the first aspect. Based on the terminal device in the second aspect, the terminal device may dynamically determine the intra-frequency and/or inter-frequency cell-reselection measurement threshold, the radio link failure threshold, or the intra-frequency and/or inter-frequency connected-state measurement threshold based on the location information of the network device. The terminal device properly uses different thresholds when the network device is in different locations, so that the terminal device can be prevented from triggering intra-frequency and/or inter-frequency cell-reselection measurement or intra-frequency and/or inter-frequency connected-state measurement excessively early or excessively late or detecting a radio link detection failure. This improves reliability of a communication system and facilitates energy saving of the terminal device.

In a possible design, the transmission parameter includes a distance between the terminal device and the network device, and the processing module is configured to: when a variation of the distance in a unit time is less than or equal to a first value, use, by the processing module, a first threshold as the intra-frequency and/or inter-frequency cell-reselection measurement threshold; or when the variation of the distance in the unit time is greater than the first value, use, by the processing module, a second threshold as the intra-frequency and/or inter-frequency cell-reselection measurement threshold, where the first threshold is less than the second threshold.

Based on this possible design, the terminal device may use, when the distance between the terminal device and the network device becomes shorter, the first threshold that is smaller as the intra-frequency and/or inter-frequency cell-reselection measurement threshold, to prevent the terminal device from triggering intra-frequency and/or inter-frequency cell-reselection measurement excessively early, thereby facilitating energy saving of the terminal device. When the distance between the terminal device and the network device becomes longer, the second threshold that is larger is used as the intra-frequency and/or inter-frequency cell-reselection measurement threshold, to prevent the terminal device from triggering intra-frequency and/or inter-frequency cell-reselection measurement excessively late, thereby improving reliability of the communication system.

In a possible design, the transmission parameter includes a height angle of the network device relative to a center of a serving cell corresponding to the terminal device, and the processing module is configured to determine, based on the height angle from a mapping relationship between a height angle and an intra-frequency and/or inter-frequency cell-reselection measurement threshold, an intra-frequency and/or inter-frequency cell-reselection measurement threshold corresponding to the height angle.

Based on this possible design, as the height angle between the network device and the center of the serving cell constantly changes, a channel status of the terminal device constantly changes. The terminal device uses different intra-frequency and/or inter-frequency cell-reselection measurement thresholds at different height angles, so that the terminal device can be prevented from triggering intra-frequency and/or inter-frequency cell-reselection measurement excessively early or excessively late, thereby improving reliability of the communication system and facilitating energy saving of the terminal device.

In a possible design, the transmission parameter includes the distance between the terminal device and the network device, and the processing module is configured to: when the variation of the distance in the unit time is less than or equal to a second value, use, by the processing module, a third threshold as the radio link failure threshold; or when the variation of the distance in the unit time is greater than the second value, use, by the processing module, a fourth threshold as the radio link failure threshold, where the third threshold is greater than the fourth threshold.

Based on this possible design, when the distance between the terminal device and the network device becomes shorter, the terminal device may use the third threshold that is larger as the radio link failure threshold, to prevent the terminal device from triggering a radio link failure recovery procedure excessively early, thereby facilitating energy saving of the terminal device. When the distance between the terminal device and the network device becomes longer, the terminal device uses the fourth threshold that is smaller as the radio link failure threshold, to prevent the terminal device from triggering the radio link failure recovery procedure excessively late, thereby improving reliability of the communication system.

In a possible design, when the transmission parameter includes the height angle of the network device relative to the center of the serving cell corresponding to the terminal device, the processing module is configured to: determine, based on the height angle from a mapping relationship between a height angle and an intra-frequency and/or inter-frequency connected-state measurement threshold, an intra-frequency and/or inter-frequency connected-state measurement threshold corresponding to the height angle.

Based on this possible design, as the height angle between the network device and the center of the serving cell constantly changes, a channel status of the terminal device constantly changes. The terminal device uses different intra-frequency and/or inter-frequency connected-state measurement thresholds at different height angles, so that the terminal device can be prevented from triggering intra-frequency and/or inter-frequency connected-state measurement excessively early or excessively late, thereby improving reliability of the communication system and facilitating energy saving of the terminal device.

In a possible design, the processing module is further configured to periodically update the intra-frequency and/or inter-frequency cell-reselection measurement threshold, the radio link failure threshold, or the intra-frequency and/or inter-frequency connected-state measurement threshold.

Based on the possible design, the terminal device periodically updates the intra-frequency and/or inter-frequency cell-reselection measurement threshold, the radio link failure threshold, or the intra-frequency and/or inter-frequency connected-state measurement threshold, so that the terminal device can properly adjust the threshold in a communication process, thereby improving reliability of the communication system and facilitating energy saving of the terminal device.

In a possible design, the processing module is further configured to: when determining that the terminal device is located at an edge of the serving cell, perform intra-frequency and/or inter-frequency cell-reselection measurement, or perform intra-frequency connected-state measurement.

Based on this possible design, when the terminal device is located at the edge of the serving cell, the terminal device may trigger intra-frequency and/or inter-frequency cell-reselection measurement or trigger intra-frequency connected-state measurement, to avoid unnecessary power consumption caused because no suitable neighboring cell is found when the terminal device starts intra-frequency and/or inter-frequency cell-reselection measurement or intra-frequency connected-state measurement at the center of the serving cell, thereby facilitating energy saving of the terminal device. In addition, a quantity of times that the terminal device triggers intra-frequency and/or inter-frequency cell-reselection measurement or intra-frequency connected-state measurement can be reduced, thereby improving flexibility of intra-frequency and/or inter-frequency cell-reselection measurement or intra-frequency connected-state measurement, and improving efficiency of intra-frequency and/or inter-frequency cell-reselection measurement or intra-frequency connected-state measurement.

In a possible design, the processing module is further configured to: when determining that a distance between the network device and the center of the serving cell is the shortest, perform intra-frequency and/or inter-frequency cell-reselection measurement based on the intra-frequency and/or inter-frequency cell-reselection measurement threshold.

Based on this possible design, when the distance between the network device and the center of the serving cell is the shortest, the terminal device may determine, based on the intra-frequency and/or inter-frequency cell-reselection measurement threshold, whether to trigger intra-frequency and/or inter-frequency cell-reselection measurement, thereby reducing a quantity of times that the terminal device triggers intra-frequency and/or inter-frequency cell-reselection measurement, and improving flexibility of intra-frequency and/or inter-frequency cell-reselection measurement efficiency.

In a possible design, the processing module is further configured to: determine, based on indication information sent by the network device based on a location of the terminal device in the serving cell, whether to trigger intra-frequency and/or inter-frequency connected-state measurement; and when the indication information indicates to trigger intra-frequency and/or inter-frequency connected-state measurement, perform intra-frequency and/or inter-frequency connected-state measurement based on the intra-frequency and/or inter-frequency connected-state measurement threshold.

Based on this possible design, when the terminal device is located at the edge of the serving cell, the network device may indicate the terminal device to trigger intra-frequency and/or inter-frequency connected-state measurement based on the intra-frequency and/or inter-frequency connected-state measurement threshold, to avoid unnecessary power consumption caused because no suitable neighboring cell is found when the terminal device starts intra-frequency and/or inter-frequency connected-state measurement at the center of the serving cell, thereby facilitating energy saving of the terminal device. In addition, a quantity of times that the terminal device triggers intra-frequency and/or inter-frequency connected-state measurement can be reduced, thereby improving flexibility of intra-frequency and/or inter-frequency connected-state measurement, and improving efficiency of intra-frequency and/or inter-frequency connected-state measurement.

According to a third aspect, a terminal device is provided. The terminal device may be a terminal device or a chip or a system-on-a-chip in the terminal device. The terminal device may implement functions performed by the terminal device in the foregoing aspects or the possible designs, and the functions may be implemented by hardware. In a possible design, the terminal device may include a transceiver and a processor. The transceiver and the processor may be configured to support the terminal device in implementing the functions in any one of the first aspect or the possible designs of the first aspect. For example, the transceiver may be configured to obtain a transmission parameter of a network device, where the transmission parameter indicates location information of the network device. The processor may be configured to determine an intra-frequency and/or inter-frequency cell-reselection measurement threshold based on the transmission parameter. Alternatively, the processor may be configured to determine a radio link failure threshold based on the transmission parameter; or the processor may be configured to determine an intra-frequency and/or inter-frequency connected-state measurement threshold based on the transmission parameter. In another possible design, the terminal device may further include a memory, and the memory is configured to store computer-executable instructions and data that are necessary for the terminal device. When the terminal device runs, the transceiver and the processor execute the computer-executable instructions stored in the memory, to enable the terminal device to perform the transmission parameter obtaining method according to any one of the first aspect or the possible designs of the first aspect.

For a specific implementation of the terminal device, refer to behavior functions of the terminal device in the transmission parameter obtaining method according to any one of the first aspect or the possible designs of the first aspect.

According to a fourth aspect, a transmission parameter obtaining method is provided. The method includes: obtaining, by a terminal device, a channel status obtained by the terminal device through measurement in a corresponding serving cell; and determining, by the terminal device, an intra-frequency and/or inter-frequency cell-reselection measurement threshold based on the channel status; determining, by the terminal device, a radio link failure threshold based on the channel status; or determining, by the terminal device, an intra-frequency and/or inter-frequency connected-state measurement threshold based on the channel status.

Based on the fourth aspect, the terminal device may dynamically determine, based on the channel status of the terminal device, the intra-frequency and/or inter-frequency cell-reselection measurement threshold, the radio link failure threshold, or the intra-frequency and/or inter-frequency connected-state measurement threshold. The terminal device properly uses different thresholds in different channel statuses, so that the terminal device can be prevented from triggering intra-frequency and/or inter-frequency cell-reselection measurement or intra-frequency and/or inter-frequency connected-state measurement excessively early or excessively late or detecting a radio link detection failure. This improves reliability of a communication system and facilitates energy saving of the terminal In a possible design, the determining, by the terminal device, an intra-frequency and/or inter-frequency cell-reselection measurement threshold based on the channel status includes: when a variation of the channel status in a unit time is greater than or equal to a third value, using, by the terminal device, a fifth threshold as the intra-frequency and/or inter-frequency cell-reselection measurement threshold; or when the variation of the channel status in the unit time is less than the third value, using, by the terminal device, a sixth threshold as the intra-frequency and/or inter-frequency cell-reselection measurement threshold, where the fifth threshold is less than the sixth threshold.

Based on this possible design, the terminal device may use, when the channel status of the terminal device becomes better, the fifth threshold that is smaller as the intra-frequency and/or inter-frequency cell-reselection measurement threshold, to prevent the terminal device from triggering intra-frequency and/or inter-frequency cell-reselection measurement excessively early, thereby facilitating energy saving of the terminal device. When the channel status of the terminal device becomes poorer, the sixth threshold that is larger is used as the intra-frequency and/or inter-frequency cell-reselection measurement threshold, to prevent the terminal device from triggering intra-frequency and/or inter-frequency cell-reselection measurement excessively late, thereby improving reliability of the communication system.

In a possible design, the determining, by the terminal device, a radio link failure threshold based on the channel status includes: when the variation of the channel status in the unit time is greater than or equal to a fourth value, using, by the terminal device, a seventh threshold as the radio link failure threshold; or when the variation of the channel status in the unit time is less than the fourth value, using, by the terminal device, an eighth threshold as the radio link failure threshold, where the seventh threshold is greater than the eighth threshold.

Based on this possible design, when the channel status of the terminal device becomes better, the terminal device may use the seventh threshold that is larger as the radio link failure threshold, to prevent the terminal device from triggering a radio link failure recovery procedure excessively early, thereby facilitating energy saving of the terminal device. When the channel status of the terminal device becomes poorer, the terminal device uses the eighth threshold that is smaller as the radio link failure threshold, to prevent the terminal device from triggering the radio link failure recovery procedure excessively late, thereby improving reliability of the communication system.

In a possible design, the determining, by the terminal device, an intra-frequency and/or inter-frequency connected-state measurement threshold based on the channel state includes: when the variation of the channel status in the unit time is greater than or equal to a fifth value, using, by the terminal device, a ninth threshold as the intra-frequency and/or inter-frequency connected-state measurement threshold; or when the variation of the channel status in the unit time is less than the fifth value, using, by the terminal device, a tenth threshold as the intra-frequency and/or inter-frequency connected-state measurement threshold, where the ninth threshold is less than the tenth threshold.

Based on this possible design, the terminal device may use, when the channel status of the terminal device becomes better, the ninth threshold that is smaller as the intra-frequency and/or inter-frequency connected-state measurement threshold, to prevent the terminal device from triggering intra-frequency and/or inter-frequency connected-state measurement excessively early, thereby facilitating energy saving of the terminal device. When the channel status of the terminal device becomes poorer, the tenth threshold that is larger is used as the intra-frequency and/or inter-frequency connected-state measurement threshold, to prevent the terminal device from triggering intra-frequency and/or inter-frequency connected-state measurement excessively late, thereby improving reliability of the communication system.

According to a fifth aspect, a terminal device is provided. The terminal device may implement functions performed by the terminal device in the fourth aspect or the possible designs of the fourth aspect, and the functions may be implemented by hardware by executing corresponding software. The hardware or the software includes one or more modules corresponding to the functions, for example, a processing module. The processing module is configured to obtain a channel status obtained by the terminal device through measurement in a corresponding serving cell. The processing module is further configured to determine an intra-frequency and/or inter-frequency cell-reselection measurement threshold based on the channel status. Alternatively, the processing module is further configured to determine a radio link failure threshold based on the channel status; or the processing module is further configured to determine an intra-frequency and/or inter-frequency connected-state measurement threshold based on the channel status.

For a specific implementation of the terminal device, refer to behavior functions of the terminal device in the transmission parameter obtaining method according to any one of the fourth aspect or the possible designs of the fourth aspect. Based on the terminal device in the fifth aspect, the terminal device may dynamically determine the intra-frequency and/or inter-frequency cell-reselection measurement threshold, the radio link failure threshold, or the intra-frequency and/or inter-frequency connected-state measurement threshold based on the channel status of the terminal device. The terminal device properly uses different thresholds in different channel statuses, so that the terminal device can be prevented from triggering intra-frequency and/or inter-frequency cell-reselection measurement or intra-frequency and/or inter-frequency connected-state measurement excessively early or excessively late or detecting a radio link detection failure. This improves reliability of a communication system and facilitates energy saving of the terminal In a possible design, the processing module is configured to: when a variation of the channel status in a unit time is greater than or equal to a third value, use, by the processing module, a fifth threshold as the intra-frequency and/or inter-frequency cell-reselection measurement threshold; or when the variation of the channel status in the unit time is less than the third value, using, by the processing module, a sixth threshold as the intra-frequency and/or inter-frequency cell-reselection measurement threshold, where the fifth threshold is less than the sixth threshold.

Based on this possible design, the terminal device may use, when the channel status of the terminal device becomes better, the fifth threshold that is smaller as the intra-frequency and/or inter-frequency cell-reselection measurement threshold, to prevent the terminal device from triggering intra-frequency and/or inter-frequency cell-reselection measurement excessively early, thereby facilitating energy saving of the terminal device. When the channel status of the terminal device becomes poorer, the sixth threshold that is larger is used as the intra-frequency and/or inter-frequency cell-reselection measurement threshold, to prevent the terminal device from triggering intra-frequency and/or inter-frequency cell-reselection measurement excessively late, thereby improving reliability of the communication system.

In a possible design, the processing module is configured to: when the variation of the channel status in the unit time is greater than or equal to a fourth value, use, by the processing module, a seventh threshold as the radio link failure threshold; or when the variation of the channel status in the unit time is less than the fourth value, use, by the processing module, an eighth threshold as the radio link failure threshold, where the seventh threshold is greater than the eighth threshold.

Based on this possible design, when the channel status of the terminal device becomes better, the terminal device may use the seventh threshold that is larger as the radio link failure threshold, to prevent the terminal device from triggering a radio link failure recovery procedure excessively early, thereby facilitating energy saving of the terminal device. When the channel status of the terminal device becomes poorer, the terminal device uses the eighth threshold that is smaller as the radio link failure threshold, to prevent the terminal device from triggering the radio link failure recovery procedure excessively late, thereby improving reliability of the communication system.

In a possible design, the processing module is configured to: when the variation of the channel status in the unit time is greater than or equal to a fifth value, use, by the processing module, a ninth threshold as the intra-frequency and/or inter-frequency connected-state measurement threshold; or when the variation of the channel status in the unit time is less than the fifth value, using, by the processing module, a tenth threshold as the intra-frequency and/or inter-frequency connected-state measurement threshold, where the ninth threshold is less than the tenth threshold.

Based on this possible design, the terminal device may use, when the channel status of the terminal device becomes better, the ninth threshold that is smaller as the intra-frequency and/or inter-frequency connected-state measurement threshold, to prevent the terminal device from triggering intra-frequency and/or inter-frequency connected-state measurement excessively early, thereby facilitating energy saving of the terminal device. When the channel status of the terminal device becomes poorer, the tenth threshold that is larger is used as the intra-frequency and/or inter-frequency connected-state measurement threshold, to prevent the terminal device from triggering intra-frequency and/or inter-frequency connected-state measurement excessively late, thereby improving reliability of the communication system.

According to a sixth aspect, a terminal device is provided. The terminal device may be a terminal device or a chip or a system-on-a-chip in the terminal device. The terminal device may implement functions performed by the terminal device in the foregoing aspects or the possible designs, and the functions may be implemented by hardware. In a possible design, the terminal device may include a processor. The processor may be configured to support the terminal device in implementing the functions in any one of the fourth aspect or the possible designs of the fourth aspect. For example, the processor may be configured to obtain a channel status obtained by the terminal device through measurement in a corresponding serving cell. The processor may be configured to determine an intra-frequency and/or inter-frequency cell-reselection measurement threshold based on the channel status. Alternatively, the processor may be configured to determine a radio link failure threshold based on the channel status; or the processor may be configured to determine an intra-frequency and/or inter-frequency connected-state measurement threshold based on the channel status. In another possible design, the terminal device may further include a memory, and the memory is configured to store computer-executable instructions and data that are necessary for the terminal device. When the terminal device runs, the processor executes the computer-executable instructions stored in the memory, to enable the terminal device to perform the transmission parameter obtaining method according to any one of the fourth aspect or the possible designs of the fourth aspect.

For a specific implementation of the terminal device, refer to behavior functions of the terminal device in the transmission parameter obtaining method according to any one of the fourth aspect or the possible designs of the fourth aspect.

According to a seventh aspect, an embodiment of this application provides a transmission parameter obtaining method, where the method includes: sending, by a network device to a terminal device, a transmission parameter indicating location information of the network device, so that the terminal device determines an intra-frequency and/or inter-frequency cell-reselection measurement threshold based on the transmission parameter, determines a radio link failure threshold based on the transmission parameter, or determines an intra-frequency and/or inter-frequency connected-state measurement threshold based on the transmission parameter.

Based on the seventh aspect, the network device indicates the location information of the terminal to the terminal device, so that the terminal device can dynamically determine the intra-frequency and/or inter-frequency cell-reselection measurement threshold, the radio link failure threshold, or the intra-frequency and/or inter-frequency connected-state measurement threshold based on the location information of the network device. In this way, the terminal device properly uses different thresholds when the network device is in different locations, so that the terminal device can be prevented from triggering intra-frequency and/or inter-frequency cell-reselection measurement or intra-frequency and/or inter-frequency connected-state measurement excessively early or excessively late or detecting a radio link detection failure. This improves reliability of a communication system and facilitates energy saving of the terminal device.

In a possible design, the transmission parameter includes a distance between the terminal device and the network device. In this case, the terminal device uses a first threshold as the intra-frequency and/or inter-frequency cell-reselection measurement threshold when a variation of the distance in a unit time is less than or equal to a first value; or uses a second threshold as the intra-frequency and/or inter-frequency cell-reselection measurement threshold when the variation of the distance in the unit time is greater than the first value, where the first threshold is less than the second threshold.

Based on this possible design, the terminal device may use, when the distance between the terminal device and the network device becomes shorter, the first threshold that is smaller as the intra-frequency and/or inter-frequency cell-reselection measurement threshold, to prevent the terminal device from triggering intra-frequency and/or inter-frequency cell-reselection measurement excessively early, thereby facilitating energy saving of the terminal device. When the distance between the terminal device and the network device becomes longer, the terminal device may use the second threshold that is larger as the intra-frequency and/or inter-frequency cell-reselection measurement threshold, to prevent the terminal device from triggering intra-frequency and/or inter-frequency cell-reselection measurement excessively late, thereby improving reliability of the communication system.

In a possible design, the transmission parameter includes a height angle of the network device relative to a center of a serving cell corresponding to the terminal device. In this case, the terminal device determines, based on the height angle from a mapping relationship between a height angle and an intra-frequency and/or inter-frequency cell-reselection measurement threshold, an intra-frequency and/or inter-frequency cell-reselection measurement threshold corresponding to the height angle.

Based on this possible design, as the height angle between the network device and the center of the serving cell constantly changes, a channel status of the terminal device constantly changes. The terminal device uses different intra-frequency and/or inter-frequency cell-reselection measurement thresholds at different height angles, so that the terminal device can be prevented from triggering intra-frequency and/or inter-frequency cell-reselection measurement excessively early or excessively late, thereby improving reliability of the communication system and facilitating energy saving of the terminal device.

In a possible design, the transmission parameter includes the distance between the terminal device and the network device. In this case, the terminal device uses a third threshold as the radio link failure threshold when the variation of the distance in the unit time is less than or equal to a second value; or uses a fourth threshold as the radio link failure threshold when the variation of the distance in the unit time is greater than the second value, where the third threshold is greater than the fourth threshold.

Based on this possible design, when the distance between the terminal device and the network device becomes shorter, the terminal device may use the third threshold that is larger as the radio link failure threshold, to prevent the terminal device from triggering a radio link failure recovery procedure excessively early, thereby facilitating energy saving of the terminal device. When the distance between the terminal device and the network device becomes longer, the terminal device may use the fourth threshold that is smaller as the radio link failure threshold, to prevent the terminal device from triggering the radio link failure recovery procedure excessively late, thereby improving reliability of the communication system.

In a possible design, the transmission parameter includes a height angle of the network device relative to a center of a serving cell corresponding to the terminal device. In this case, the terminal device determines, based on the height angle from a mapping relationship between a height angle and an intra-frequency and/or inter-frequency connected-state measurement threshold, an intra-frequency and/or inter-frequency connected-state measurement threshold corresponding to the height angle.

Based on this possible design, as the height angle between the network device and the center of the serving cell constantly changes, a channel status of the terminal device constantly changes. The terminal device uses different intra-frequency and/or inter-frequency connected-state measurement thresholds at different height angles, so that the terminal device can be prevented from triggering intra-frequency and/or inter-frequency connected-state measurement excessively early or excessively late, thereby improving reliability of the communication system and facilitating energy saving of the terminal device.

In a possible design, the network device determines a location of the terminal device in the serving cell; and sends indication information to the terminal device based on the location of the terminal device in the serving cell, so that the terminal device determines, based on the indication information, whether to trigger intra-frequency and/or inter-frequency connected-state measurement. When the indication information indicates to trigger intra-frequency and/or inter-frequency connected-state measurement, the terminal device performs intra-frequency and/or inter-frequency connected-state measurement based on the intra-frequency and/or inter-frequency connected-state measurement threshold.

Based on this possible design, when the terminal device is located at the edge of the serving cell, the network device may indicate the terminal device to trigger intra-frequency and/or inter-frequency connected-state measurement based on the intra-frequency and/or inter-frequency connected-state measurement threshold, to avoid unnecessary power consumption caused because no suitable neighboring cell is found when the terminal device starts intra-frequency and/or inter-frequency connected-state measurement at the center of the serving cell, thereby facilitating energy saving of the terminal device. In addition, a quantity of times that the terminal device triggers intra-frequency and/or inter-frequency connected-state measurement can be reduced, thereby improving flexibility of intra-frequency and/or inter-frequency connected-state measurement, and improving efficiency of intra-frequency and/or inter-frequency connected-state measurement.

According to an eighth aspect, a network device is provided. The network device may implement functions performed by the network device in the seventh aspect or the possible designs of the seventh aspect, and the functions may be implemented by hardware by executing corresponding software. The hardware or the software includes one or more modules corresponding to the functions, for example, a sending module. The sending module is configured to send, to a terminal device, a transmission parameter indicating location information of the network device, so that the terminal device determines an intra-frequency and/or inter-frequency cell-reselection measurement threshold based on the transmission parameter, determines a radio link failure threshold based on the transmission parameter, or determines an intra-frequency and/or inter-frequency connected-state measurement threshold based on the transmission parameter.

For a specific implementation of the network device, refer to behavior functions of the network device in the transmission parameter obtaining method according to any one of the seventh aspect or the possible designs of the seventh aspect. Based on the network device in the eighth aspect, the network device indicates the location information of the terminal to the terminal device, so that the terminal device can dynamically determine the intra-frequency and/or inter-frequency cell-reselection measurement threshold, the radio link failure threshold, or the intra-frequency and/or inter-frequency connected-state measurement threshold based on the location information of the network device. In this way, the terminal device properly uses different thresholds when the network device is in different locations, so that the terminal device can be prevented from triggering intra-frequency and/or inter-frequency cell-reselection measurement or intra-frequency and/or inter-frequency connected-state measurement excessively early or excessively late or detecting a radio link detection failure. This improves reliability of a communication system and facilitates energy saving of the terminal device.

In a possible design, the transmission parameter includes a distance between the terminal device and the network device. In this case, the terminal device uses a first threshold as the intra-frequency and/or inter-frequency cell-reselection measurement threshold when a variation of the distance in a unit time is less than or equal to a first value; or uses a second threshold as the intra-frequency and/or inter-frequency cell-reselection measurement threshold when the variation of the distance in the unit time is greater than the first value, where the first threshold is less than the second threshold.

Based on this possible design, the terminal device may use, when the distance between the terminal device and the network device becomes shorter, the first threshold that is smaller as the intra-frequency and/or inter-frequency cell-reselection measurement threshold, to prevent the terminal device from triggering intra-frequency and/or inter-frequency cell-reselection measurement excessively early, thereby facilitating energy saving of the terminal device. When the distance between the terminal device and the network device becomes longer, the terminal device may use the second threshold that is larger as the intra-frequency and/or inter-frequency cell-reselection measurement threshold, to prevent the terminal device from triggering intra-frequency and/or inter-frequency cell-reselection measurement excessively late, thereby improving reliability of the communication system.

In a possible design, the transmission parameter includes a height angle of the network device relative to a center of a serving cell corresponding to the terminal device. In this case, the terminal device determines, based on the height angle from a mapping relationship between a height angle and an intra-frequency and/or inter-frequency cell-reselection measurement threshold, an intra-frequency and/or inter-frequency cell-reselection measurement threshold corresponding to the height angle.

Based on this possible design, as the height angle between the network device and the center of the serving cell constantly changes, a channel status of the terminal device constantly changes. The terminal device uses different intra-frequency and/or inter-frequency cell-reselection measurement thresholds at different height angles, so that the terminal device can be prevented from triggering intra-frequency and/or inter-frequency cell-reselection measurement excessively early or excessively late, thereby improving reliability of the communication system and facilitating energy saving of the terminal device.

In a possible design, the transmission parameter includes the distance between the terminal device and the network device. In this case, the terminal device uses a third threshold as the radio link failure threshold when the variation of the distance in the unit time is less than or equal to a second value; or uses a fourth threshold as the radio link failure threshold when the variation of the distance in the unit time is greater than the second value, where the third threshold is greater than the fourth threshold.

Based on this possible design, when the distance between the terminal device and the network device becomes shorter, the terminal device may use the third threshold that is larger as the radio link failure threshold, to prevent the terminal device from triggering a radio link failure recovery procedure excessively early, thereby facilitating energy saving of the terminal device. When the distance between the terminal device and the network device becomes longer, the terminal device may use the fourth threshold that is smaller as the radio link failure threshold, to prevent the terminal device from triggering the radio link failure recovery procedure excessively late, thereby improving reliability of the communication system.

In a possible design, the transmission parameter includes a height angle of the network device relative to a center of a serving cell corresponding to the terminal device. In this case, the terminal device determines, based on the height angle from a mapping relationship between a height angle and an intra-frequency and/or inter-frequency connected-state measurement threshold, an intra-frequency and/or inter-frequency connected-state measurement threshold corresponding to the height angle.

Based on this possible design, as the height angle between the network device and the center of the serving cell constantly changes, a channel status of the terminal device constantly changes. The terminal device uses different intra-frequency and/or inter-frequency connected-state measurement thresholds at different height angles, so that the terminal device can be prevented from triggering intra-frequency and/or inter-frequency connected-state measurement excessively early or excessively late, thereby improving reliability of the communication system and facilitating energy saving of the terminal device.

In a possible design, the network device further includes a processing module, where the processing module is configured to determine a location of the terminal device in the serving cell. The sending module is further configured to send indication information to the terminal device based on the location of the terminal device in the serving cell, so that the terminal device determines, based on the indication information, whether to trigger intra-frequency and/or inter-frequency connected-state measurement. When the indication information indicates to trigger intra-frequency and/or inter-frequency connected-state measurement, the terminal device performs intra-frequency and/or inter-frequency connected-state measurement based on the intra-frequency and/or inter-frequency connected-state measurement threshold.

Based on this possible design, when the terminal device is located at the edge of the serving cell, the network device may indicate the terminal device to trigger intra-frequency and/or inter-frequency connected-state measurement based on the intra-frequency and/or inter-frequency connected-state measurement threshold, to avoid unnecessary power consumption caused because no suitable neighboring cell is found when the terminal device starts intra-frequency and/or inter-frequency connected-state measurement at the center of the serving cell, thereby facilitating energy saving of the terminal device. In addition, a quantity of times that the terminal device triggers intra-frequency and/or inter-frequency connected-state measurement can be reduced, thereby improving flexibility of intra-frequency and/or inter-frequency connected-state measurement, and improving efficiency of intra-frequency and/or inter-frequency connected-state measurement.

According to a ninth aspect, a network device is provided. The network device may be a network device or a chip or a system-on-a-chip in the network device. The network device may implement functions performed by the network device in the foregoing aspects or the possible designs, and the functions may be implemented by hardware. In a possible design, the network device may include a transceiver. The transceiver may be configured to support the network device in implementing the functions in any one of the seventh aspect or the possible designs of the seventh aspect. For example, the transceiver may be configured to send, to a terminal device, a transmission parameter indicating location information of the network device, so that the terminal device determines an intra-frequency and/or inter-frequency cell-reselection measurement threshold based on the transmission parameter, determines a radio link failure threshold based on the transmission parameter, or determines an intra-frequency and/or inter-frequency connected-state measurement threshold based on the transmission parameter. In another possible design, the network device may further include a processor and a memory, and the memory is configured to store computer-executable instructions and data that are necessary for the terminal device. When the network device runs, the transceiver and the processor execute the computer-executable instructions stored in the memory, to enable the network device to perform the transmission parameter obtaining method according to any one of the seventh aspect or the possible designs of the seventh aspect.

For a specific implementation of the network device, refer to behavior functions of the network device in the transmission parameter obtaining method according to any one of the seventh aspect or the possible designs of the seventh aspect.

According to a tenth aspect, a computer-readable storage medium is provided. The computer-readable storage medium stores computer instructions or a program. When the computer instructions or the program is run on a computer, the computer is enabled to perform the transmission parameter obtaining method according to any one of the first aspect or the possible designs of the first aspect, perform the transmission parameter obtaining method according to any one of the fourth aspect or the possible designs of the fourth aspect, or perform the transmission parameter obtaining method according to any one of the seventh aspect or the possible designs of the seventh aspect.

According to an eleventh aspect, a computer program product including instructions is provided. When the computer program product runs on a computer, the computer is enabled to perform the transmission parameter obtaining method according to any one of the first aspect or the possible designs of the first aspect, perform the transmission parameter obtaining method according to any one of the fourth aspect or the possible designs of the fourth aspect, or perform the transmission parameter obtaining method according to any one of the seventh aspect or the possible designs of the seventh aspect.

According to a twelfth aspect, a chip system is provided. The chip system includes one or more processors and one or more memories, the one or more memories are coupled to the one or more processors, and the one or more memories store computer program code or computer instructions. When the one or more processors execute the computer program code or the computer instructions, the chip system is enabled to perform the transmission parameter obtaining method according to any one of the first aspect or the possible designs of the first aspect, perform the transmission parameter obtaining method according to any one of the fourth aspect or the possible designs of the fourth aspect, or perform the transmission parameter obtaining method according to any one of the seventh aspect or the possible designs of the seventh aspect.

For technical effects brought by any one of the designs of the tenth aspect to the twelfth aspect, refer to technical effects brought by any one of the possible designs of the first aspect and the second aspect, refer to technical effects brought by any one of the possible designs of the fourth aspect and the fifth aspect, or refer to technical effects brought by any one of the possible designs of the seventh aspect and the eighth aspect. Details are not described again.

According to a thirteenth aspect, a communication system is provided. The communication system includes the terminal device according to any one of the second aspect and the third aspect or the terminal device according to any one of the fifth aspect and the sixth aspect, and the network device according to any one of the eighth aspect and the ninth aspect.

BRIEF DESCRIPTION OF DRAWINGS

FIG. 3d is a flowchart of a transmission parameter obtaining method according to an embodiment of this application;

FIG. 4a is a flowchart of a transmission parameter obtaining method according to an embodiment of this application;

FIG. 4b is a flowchart of a transmission parameter obtaining method according to an embodiment of this application;

DESCRIPTION OF EMBODIMENTS

Figure 1A:
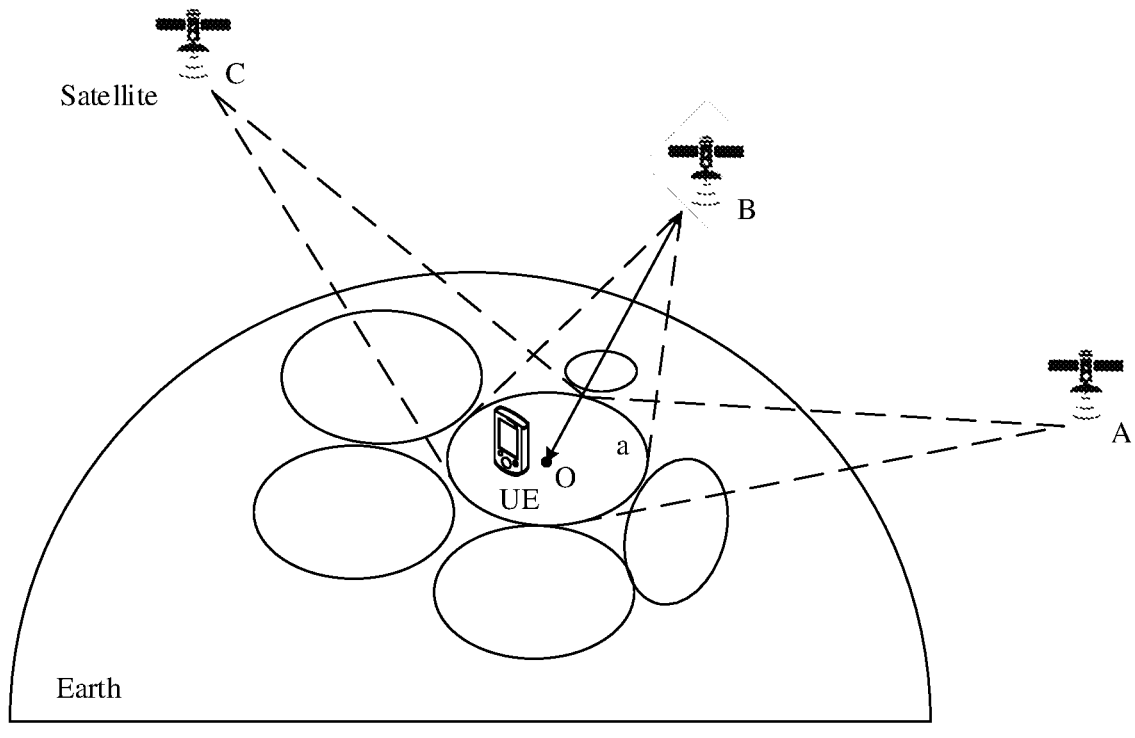
FIG. 1a is a schematic diagram of a satellite trajectory according to an embodiment of this application.

Before embodiments of this application are described, technical terms used in embodiments of this application are described.

In a communication system, cells supporting a same communication system may be referred to as intra-RAT cells, and cells supporting different communication systems may be referred to as inter-RAT cells. For cells supporting a same communication system, if center frequencies of neighboring cells are the same, the cells may be referred to as intra-frequency cells; otherwise, the cells are referred to as inter-frequency cells.

A serving cell is a cell that currently provides a communication service for a terminal device, and the serving cell may also be described as a cell on which the terminal device currently camps.

Idle (idle) state: When a terminal device does not establish a communication connection to a network device by using a random access procedure, the terminal device is in an idle state. The idle state may mean that there is no radio resource control (radio resource control, RRC) connection between a terminal device and a network device. The idle state may be referred to as an RRC_idle state. When a terminal device is in an idle state, a network device does not store a context of the terminal device, there is no non-access stratum (non-access stratum, NAS) signaling connection between the terminal device and a core network device (for example, a mobility management network element), there is no N2 connection between the network device and the core network device (for example, a mobility management network element), and the core network device stores the context of the terminal device. The network device does not know whether the terminal device is within a coverage area of the network device. The core network device does not know the terminal device is located in a coverage area or a management range of which network device, and the network device does not know which network device can be used to locate or find the terminal device.

Connected state: When a terminal device does not establish a communication connection to a network device by using a random access procedure, the terminal device is in a connected state. The connected state may include an RRC connected state or a connection management (connection management, CM) connected state. The RRC connected state may mean that there is an RRC connection between the terminal device and the network device, and the CM connected state may mean that there is a NAS signaling connection between the terminal device and a core network device (for example, a mobility management network element), and there is an N2 connection between the network device and the core network device. When the terminal device is in the RRC connected state and the CM connected state, both the network device and the core network device store a context of the terminal device. The network device knows that the terminal device is in a coverage area of the network device or in a management range of the network device. The core network device knows which network device can be used to locate or find the terminal device. In the connected state, the terminal device may perform downlink data and/or uplink data transmission with the network device.

Cell reselection: When a terminal device is in an idle state, the terminal device may change a cell through cell reselection. For example, it is assumed that the terminal device is in coverage areas of both a serving cell and a neighboring cell in a movement process. In this case, the terminal device may camp on the neighboring cell through cell reselection when a cell reselection condition is met, to obtain a better communication service. The cell reselection may include intra-RAT intra-frequency cell-reselection measurement, intra-RAT inter-frequency cell-reselection measurement, and/or inter-RAT inter-RAT cell-reselection measurement. It should be noted that intra-frequency cell-reselection measurement may also be described as intra-frequency idle-state measurement, inter-frequency cell-reselection measurement may also be described as inter-frequency idle-state measurement, and inter-RAT cell-reselection measurement may also be described as inter-RAT idle-state measurement. This is not limited.

A terminal device may determine, based on a cell priority of a serving cell, a cell priority of a neighboring cell, and an intra-frequency and/or inter-frequency cell-reselection measurement threshold, whether to change from the serving cell to the neighboring cell.

For example, refer to the following Table 1. For a neighboring cell whose cell priority is higher than that of a serving cell, regardless of a channel status of a terminal device in the serving cell, the terminal device unconditionally starts inter-frequency cell-reselection measurement and inter-RAT cell-reselection measurement. For a neighboring cell whose cell priority is equal to that of a serving cell, a terminal device may measure a channel status of the terminal device in the serving cell. When the channel status in the serving cell is less than or equal to an intra-frequency cell-reselection measurement threshold, intra-frequency cell-reselection measurement is started. When the channel status in the serving cell is less than or equal to an inter-frequency cell-reselection measurement threshold, inter-frequency cell-reselection measurement is started. For a neighboring cell whose cell priority is lower than that of a serving cell, a terminal device may compare a channel status of the terminal device in the serving cell with an inter-frequency cell-reselection measurement threshold. If the channel status is less than or equal to the inter-frequency cell-reselection measurement threshold, the terminal device starts inter-frequency cell-reselection measurement and inter-RAT cell-reselection measurement. It should be noted that, the intra-frequency cell-reselection measurement threshold may also be described as an intra-frequency idle-state measurement threshold, and the inter-frequency cell-reselection measurement threshold may also be described as an inter-frequency idle-state measurement threshold.

When performing cell-reselection measurement, the terminal device may receive a system message of the neighboring cell, and determine, based on the system information of the neighboring cell, whether to hand over from the serving cell to the neighboring cell. For example, the cell priority of the neighboring cell is higher than the cell priority of the serving cell. Assuming that the system information of the neighboring cell indicates that the neighboring cell has no access limit, the terminal device may hand over from the serving cell to the neighboring cell. If the system information of the neighboring cell indicates that the neighboring cell has reached an upper access limit, the terminal device continues to camp on the current serving cell.

TABLE 1

| Priority | Start cell-reselection measurement |
| --- | --- |
| Neighboring cell > Serving cell | Start inter-frequency cell-reselection measurement and inter-RAT cell-reselection measurement |
| Neighboring cell = Serving cell | When a channel status is lower than or equal to an intra-frequency cell-reselection measurement threshold, start intra-frequency cell-reselection measurement When the channel status is lower than or equal to an inter-frequency cell-reselection measurement threshold, start inter-frequency cell-reselection measurement |
| Neighboring cell < Serving cell | When the channel status is lower than or equal to the inter-frequency cell-reselection measurement threshold, start inter-frequency cell-reselection measurement and inter-RAT cell-reselection measurement |

The channel status may also be described as signal quality, channel quality, or the like. This is not limited. The channel status may include one or more of parameters such as reference signal received power (reference signal received power, RSRP), reference signal received quality (reference signal received quality, RSRQ), a signal-to-noise ratio (signal to noise ratio, SNR), and a signal to interference plus noise ratio (signal to interference plus noise ratio, SINR), or may include another parameter indicating signal quality of the terminal device in the serving cell. This is not limited.

For example, when RSRP is used to indicate or measure the channel status, the intra-frequency cell-reselection measurement threshold may be SIntraSearchP, and the inter-frequency cell-reselection measurement threshold may be SnonIntraSearchP. When RSRQ is used to indicate or measure the channel status, the intra-frequency cell-reselection measurement threshold may be SIntraSearchQ, and the inter-frequency cell-reselection measurement threshold may be SnonIntraSearchQ.

It should be noted that a lower intra-frequency and/or inter-frequency cell-reselection measurement threshold indicates that it is more difficult for the terminal device to trigger intra-frequency and/or inter-frequency cell-reselection measurement. In other words, only when the channel status of the terminal device is very poor, a channel-status related parameter of the terminal device is lower than the measurement threshold, and intra-frequency and/or inter-frequency cell-reselection measurement is triggered.

Cell handover: When a terminal device is in a connected state, the terminal device may change a cell through cell handover. For example, it is assumed that when a terminal moves from a coverage area of a serving cell to a coverage area of a neighboring cell in a movement process, the terminal device may be handed over from the current serving cell to the neighboring cell through cell handover, to obtain a better communication service. The cell handover may include intra-RAT intra-frequency connected-state measurement, intra-RAT inter-frequency connected-state measurement, and/or inter-RAT inter-RAT connected-state measurement.

A network device may include measurement configuration information to a MeasConfig information element of a radio resource control connection reconfiguration (radio resource control connection reconfiguration, RRC connection reconfiguration) message, and send the measurement configuration information to the terminal device. The measurement configuration information includes information such as an object that is to be measured by a terminal device, a cell list, a reporting manner, a measurement identifier, and an event parameter. It should be noted that, for specific descriptions of the measurement configuration information, refer to descriptions of the measurement configuration information in an existing communication protocol. Details are not further described.

After receiving the measurement configuration information, the terminal device may measure a serving cell, determine, based on s-MeasureConfig in the RRC connection reconfiguration message, whether to measure a neighboring cell, and if yes, measure the neighboring cell to obtain a measurement result. The measurement result may be a channel status obtained by the terminal device through measurement based on a synchronization signal block (synchronization signal block, SSB), a physical broadcast channel block (physical broadcast channel block, PBCH block), or a channel state information reference signal (channel state information-reference signal, CSI-RS). When a measurement reporting condition is met, the terminal device may fill the measurement result in a measurement report (measurement report) message, and send the measurement report message to the network device. The measurement reporting condition may be that measurement report is periodically performed, or measurement report is triggered based on an event.

When the terminal device triggers the measurement report based on an event, an event-triggered reporting configuration may include various event types and thresholds, time to trigger (time to trigger) that meets a trigger condition, a type of a reference signal (such as an SSB or a CSI-RS), and the like. This is not limited.

For example, refer to Table 2. The terminal device may trigger measurement report based on the following event A1 or event A2:

TABLE 2

| Event | Importance | Entry condition | Leaving condition |
|-------|-----------|-----------------|-------------------|
| A1 | A channel status is greater than an inter-frequency connected-state measurement threshold | Ms − Hys > Thresh | Ms + Hys < Thresh |
| A2 | The channel status is less than the inter-frequency connected-state measurement threshold | Ms + Hys < Thresh | Ms − Hys > Thresh |

The event A1 is used to stop inter-frequency inter-RAT connected-state measurement and is triggered when the channel status is greater than the inter-frequency connected-state measurement threshold. The event A2 is used to start inter-frequency inter-RAT connected-state measurement and is triggered when the channel status is less than the inter-frequency connected-state measurement threshold. Ms is a measurement result for the serving cell, Hys is a hysteresis parameter for the event A1 or event A2, and Thresh is the inter-frequency connected-state measurement threshold.

It should be noted that a lower intra-frequency and/or inter-frequency connected-state measurement threshold indicates that it is more difficult for the terminal device to trigger intra-frequency and/or inter-frequency connected-state measurement. In other words, only when the channel status of the terminal device is very poor, a channel-status related parameter of the terminal device is lower than the measurement threshold, and intra-frequency and/or inter-frequency connected-state measurement is triggered.

Radio link failure recovery procedure: When a terminal device or a network device finds that a channel status is poor, or cannot decode a physical downlink control channel (physical downlink control channel, PDCCH) or a physical downlink shared channel (physical downlink shared channel, PDSCH), or cannot receive an acknowledgment (acknowledgement, ACK) frame or a non-acknowledgment (non-acknowledgement, NACK) frame, the terminal device may use a time-out (time-out) mechanism, to prevent the terminal device from waiting for feedback indefinitely. For example, when a radio link failure (radio link failure, RLF) threshold is met, the terminal device may consider that a radio link failure occurs, and trigger a radio link failure recovery procedure, to recover a connection to the serving cell or establish a connection to a new cell.

The radio link failure threshold may include one or more of the following: a physical layer reporting threshold (Qin, Qout), a physical layer failure detection quantity and timer, a maximum radio link control (radio link control, RLC) layer retransmission quantity, and a maximum media access control (media access control, MAC) layer random access preamble transmission quantity.

For the physical layer reporting threshold, a physical layer may evaluate link quality of a radio link. When the link quality is lower than Qout, the physical layer may report radio link out-of-synchronization to a higher layer. When the link quality is higher than Qin, the physical layer may report radio link synchronization to the higher layer. For the physical layer failure detection quantity and timer, an N310 counter may be used for the physical layer failure detection quantity, and a T310 timer may be used for the physical layer failure detection timer. The N310 counter is used to indicate a maximum quantity of consecutive radio link out-of-synchronization indications received. When the N310 counter reaches the maximum quantity, the T310 timer is triggered to start. After the T310 timer is started, if no consecutive N311 radio link synchronization indications are received within time of the timer, a radio link failure is determined. For the maximum RLC layer retransmission quantity, if an RLC layer retransmission quantity of the terminal device reaches the maximum RLC layer retransmission quantity, a radio link failure is determined. For the maximum MAC layer random access preamble transmission quantity, if a quantity of MAC layer random access preamble transmissions reaches the maximum transmission quantity, a radio link failure is determined.

It should be noted that a higher radio link failure threshold indicates a larger quantity of detections, a larger quantity of retransmissions, or a larger quantity of preamble transmissions that need to be performed before a radio link failure is determined, that is, it is more difficult for the terminal device to trigger the radio link failure recovery procedure. In other words, the terminal device triggers the radio link failure recovery procedure only when the link quality of the radio link is very poor.

In a non-terrestrial network (non-terrestrial network, NTN), a base station or some base station functions may be deployed on a flight platform such as a satellite, to provide seamless coverage for a terminal device. However, because the satellite keeps moving, when a distance between the satellite and a terminal device keeps changing, a channel status corresponding to the terminal device changes more sharply.

Figure 1B:
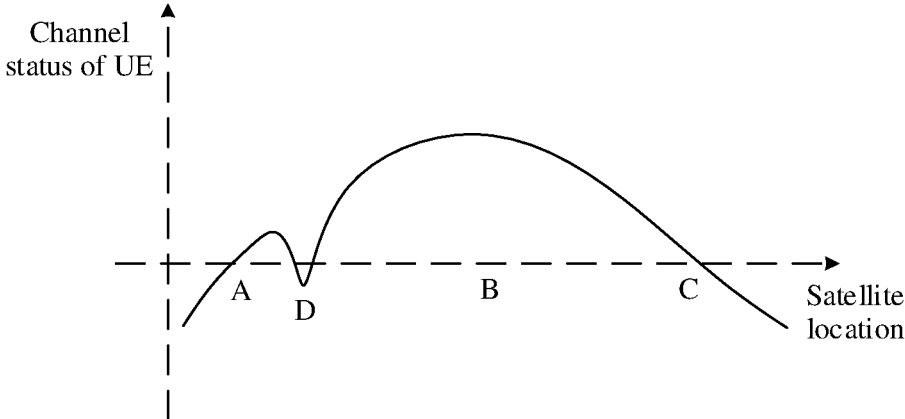
FIG. 1b is a schematic diagram of a channel status of a terminal device according to an embodiment of this application.

For example, as shown in FIG. 1a, when a satellite successively passes through points A, B, and C based on a moving trajectory, a terminal device UE located in a serving cell a may experience a process in which a channel status gradually becomes better and then gradually becomes poorer, as shown in FIG. 1b. If an intra-frequency and/or inter-frequency cell-reselection measurement threshold and an intra-frequency and/or inter-frequency connected-state measurement threshold are set to be low, or a radio link failure threshold is set to be high, when the satellite is further and further away from the terminal device, intra-frequency and/or inter-frequency cell-reselection measurement or intra-frequency and/or inter-frequency connected-state measurement cannot be triggered in time, or a radio link failure cannot be detected in time. As a result, cell reselection, cell handover, and radio link failure recovery cannot be performed in time, causing low reliability of a communication system. If the intra-frequency and/or inter-frequency cell-reselection measurement threshold and the intra-frequency and/or inter-frequency connected-state measurement threshold are set to be high, or the radio link failure threshold is set to be low, when the satellite is closer to the terminal device, the channel status of the terminal device may be poor at a moment. However, as the satellite is closer to the terminal device, the channel status of the terminal may quickly become better. If the terminal device triggers intra-frequency and/or inter-frequency cell-reselection measurement or intra-frequency and/or inter-frequency connected-state measurement or detects a radio link failure in this case, the terminal device prematurely triggers intra-frequency and/or inter-frequency cell-reselection measurement, intra-frequency and/or inter-frequency connected-state measurement, or detects the radio link failure, which is not conducive to energy saving of the terminal device. Particularly, if the channel status shown at point D in FIG. 1b suddenly deteriorates, the terminal device may trigger measurement. However, as the satellite is closer to the terminal device, the channel status of the terminal device may quickly become better. In this case, measurement is unnecessary. When the channel status fluctuates, the terminal device may frequently perform measurement. This is not conducive to energy saving. Therefore, how to properly determine the intra-frequency and/or inter-frequency cell-reselection measurement threshold, the intra-frequency and/or inter-frequency connected-state measurement threshold, or the radio link failure threshold becomes an urgent problem to be resolved.

It should be noted that, when the radio link failure threshold includes a physical layer reporting threshold (Qin, Qout), a lower physical layer reporting threshold (Qin, Qout) indicates a higher radio link failure threshold. When the radio link failure threshold includes a physical layer failure detection quantity and timer, higher parameter values of the physical layer failure detection quantity and timer indicate a higher radio link failure threshold. When the radio link failure threshold includes a maximum RLC layer retransmission quantity, a higher value of the maximum RLC layer retransmission quantity indicates a higher radio link failure threshold. When the radio link failure threshold includes a maximum MAC layer random access preamble transmission quantity, a higher value of the maximum MAC layer random access preamble transmission quantity indicates a higher radio link failure threshold.

To resolve this problem, embodiments of this application provide a transmission parameter obtaining method. A terminal device may dynamically determine an intra-frequency and/or inter-frequency cell-reselection measurement threshold, a radio link failure threshold, or an intra-frequency and/or inter-frequency connected-state measurement threshold based on location information of a network device. The terminal device properly uses different thresholds when the network device is in different locations, so that the terminal device can be prevented from triggering intra-frequency and/or inter-frequency cell-reselection measurement or intra-frequency and/or inter-frequency connected-state measurement excessively early or excessively late or detecting a radio link detection failure. This improves reliability of a communication system and facilitates energy saving of the terminal device.

The following describes implementations of embodiments of this application in detail with reference to accompanying drawings in this specification.

The transmission parameter obtaining method provided in embodiments of this application may be used in any communication system. The communication system may be a third generation partnership project (third generation partnership project, 3GPP) communication system, for example, a long term evolution (long term evolution, LTE) system; or may be a 5th generation (fifth generation, 5G) mobile communication system, a new radio (new radio, NR) system, an NR V2X system, or another next-generation communication system; or may be a non-3GPP communication system. This is not limited.

The transmission parameter obtaining method provided in embodiments of this application may be applied to a communication scenario in which a distance between a terminal device and a network device continuously changes.

Figures 1C, 1D, 1E:
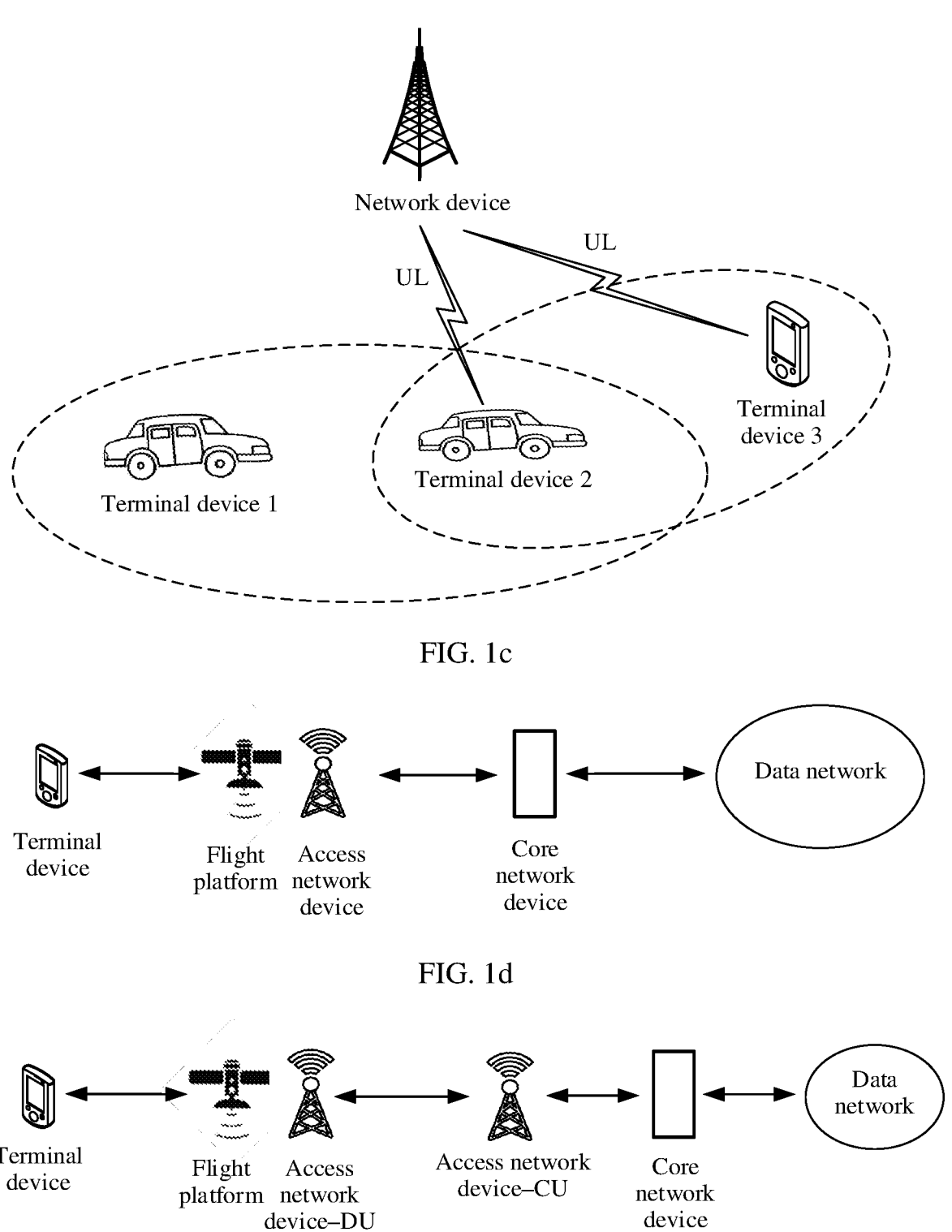
FIG. 1c is a schematic diagram of a communication system according to an embodiment of this application.
FIG. 1d is a schematic diagram of a communication architecture of a communication system according to an embodiment of this application.
FIG. 1e is a schematic diagram of a communication architecture of a communication system according to an embodiment of this application.

The following uses FIG. 1c as an example to describe in detail the transmission parameter obtaining method provided in embodiments of this application.

FIG. 1c is a schematic diagram of a communication system according to an embodiment of this application. As shown in FIG. 1c, the communication system may be an NTN communication system, and the NTN communication system may include at least one terminal device and at least one network device.

The terminal device in FIG. 1c may be located in a cell coverage area of the network device. The terminal device may perform air interface communication with the network device by using an uplink (uplink, UL) or a downlink (downlink, DL). For example, the terminal may send uplink data to the network device in a UL direction by using a physical uplink shared channel (physical uplink shared channel, PUSCH), and the network device may send downlink data to the terminal device in a DL direction by using a physical downlink shared channel (physical downlink shared channel, PDSCH).

The terminal device (terminal) in FIG. 1c may be referred to as user equipment (user equipment, UE), a mobile station (mobile station, MS), a mobile terminal (mobile terminal, MT), or the like. The terminal device in FIG. 1c may be a mobile phone (mobile phone), a tablet computer, or a computer with a wireless transceiver function. Alternatively, the terminal may be a virtual reality (virtual reality, VR) terminal, an augmented reality (augmented reality, AR) terminal, a wireless terminal in industrial control, a wireless terminal in self-driving, a wireless terminal in telemedicine, a wireless terminal in a smart grid, a wireless terminal in a smart city (smart city), a wireless terminal in a smart home (smart home), a vehicle-mounted terminal, a vehicle having a vehicle-to-vehicle (vehicle-to-vehicle, V2V) communication capability, an intelligent connected vehicle, an uncrewed aerial vehicle having a UAV-to-UAV (UAV to UAV, U2U) communication capability, or the like. This is not limited.

The network device in FIG. 1c may include an access network device and a flight platform. The access network device may be carried on the flight platform. Alternatively, the access network device may be carried on the flight platform in a distributed manner based on a distributed unit (distributed unit, DU). Alternatively, the access network device may be disposed on the ground, and the terminal device and the access network device may communicate with each other by forwarding a signal by using the flight platform.

For example, refer to FIG. 1d. When the access network device is carried on the flight platform, the communication system shown in FIG. 1c may have a communication architecture shown in FIG. 1d. As shown in FIG. 1d, the access network device moves synchronously with the flight platform, and the access network device and the flight platform may be considered as a whole.

Refer to FIG. 1e. When the access network device is carried on the flight platform in a distributed manner based on a DU, the communication system shown in FIG. 1c may have a communication architecture shown in FIG. 1e. As shown in FIG. 1e, the access network device may include an access network device-DU and an access network device-central unit (central unit, CU). The access network device-DU may be carried on the flight platform, the access network device-CU may be disposed on the ground, and the terminal device may establish a communication connection to the access network device-CU through the access network device-DU. It should be noted that the communication architecture in FIG. 1e may be considered as a special example of the communication architecture shown in FIG. 1d.

Figures 1F, 2, 3A:
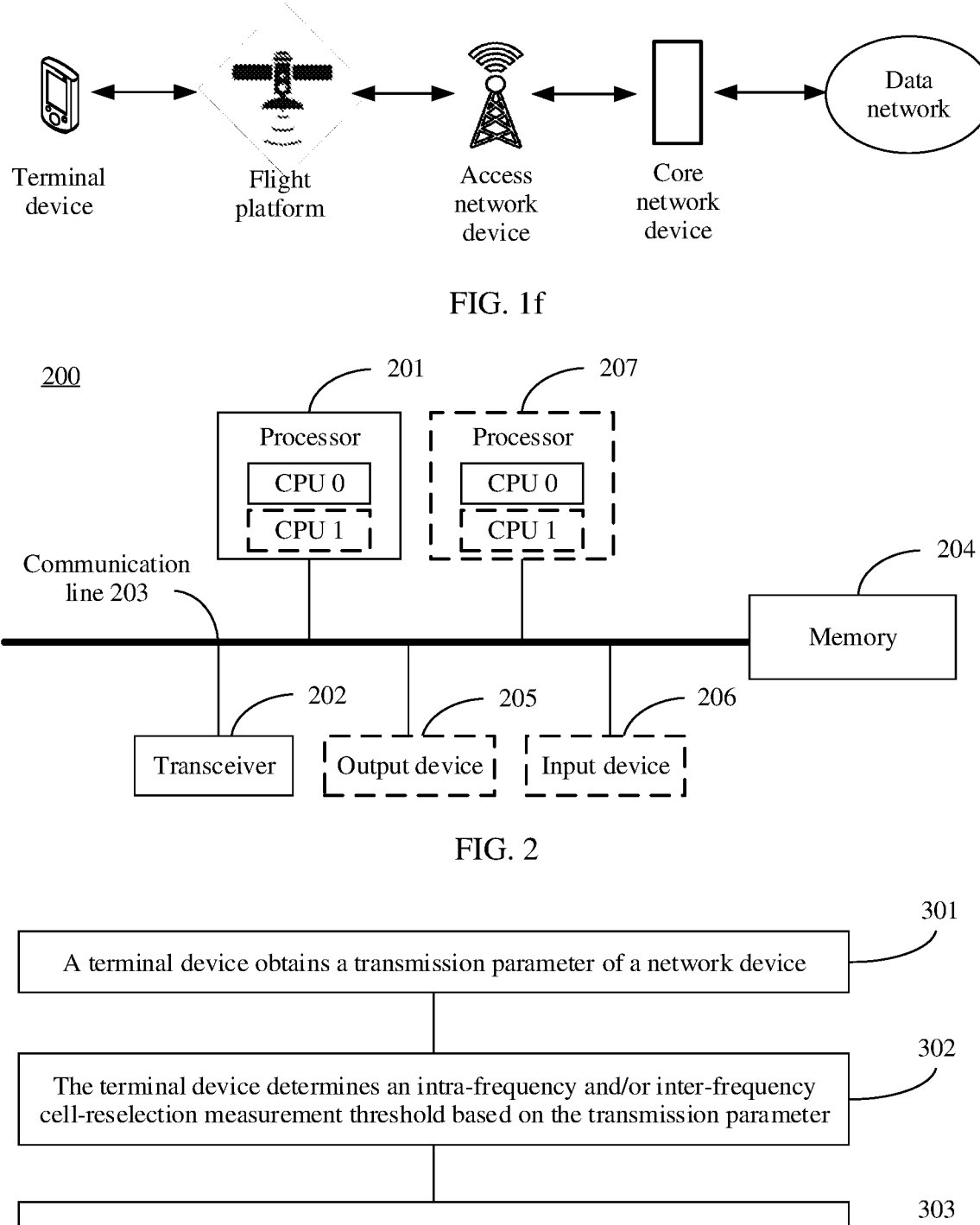
FIG. 1f is a schematic diagram of a communication architecture of a communication system according to an embodiment of this application.
FIG. 2 is a diagram of a composition structure of a communication apparatus according to an embodiment of this application.
FIG. 3a is a flowchart of a transmission parameter obtaining method according to an embodiment of this application.

Refer to FIG. 1f. When the access network device is disposed on the ground, the communication system shown in FIG. 1c may have a communication architecture shown in FIG. 1f. As shown in FIG. 1f, the terminal device may communicate with the access network device by forwarding a signal by using the flight platform. The flight platform may provide a transmission/reception point (transmission/reception point, TRP) for radio access for the terminal device. The TRP may transparently transmit data between the terminal device and the access network device, to implement a communication connection between the terminal device and the access network device.

The access network device may be any device having a wireless transceiver function, and is mainly configured to implement functions such as a radio physical control function, resource scheduling and radio resource management, radio access control, and mobility management. The network device may be a device supporting wired access, or may be a device supporting wireless access. For example, the network device may be an access network (access network, AN)/radio access network (radio access network, RAN) device, where the AN/RAN device includes a plurality of 5G-AN/5G-RAN nodes. The 5G-AN/5G-RAN node may be an access point (access point, AP), a NodeB (NodeB, NB), an enhanced NodeB (enhanced NodeB, eNB), a next-generation NodeB (NR NodeB, gNB), a transmission/reception point (transmission reception point, TRP), a transmission point (transmission point, TP) or another access node.

The flight platform may be aircraft such as a satellite or an uncrewed aerial vehicle. For example, the flight platform may include a low-earth orbit satellite, a medium-earth orbit satellite, a geosynchronous orbit satellite, an unmanned flight system platform, and a high-earth orbit satellite based on an altitude of the aircraft platform.

In addition, in FIG. 1d to FIG. 1f, the communication system may further include a core network device and a data network (data network, DN). The terminal device may communicate with the data network through the network device and the core network device.

The core network device may be configured to send, to the data network, data of the terminal device that is sent by the network device. The core network device may include network elements such as a mobility management network element, a session management network element, a policy control network element, a user plane network element, and an application function network element. This is not limited.

The data network may be an operator network that provides a data transmission service for the terminal device, for example, an operator network that may provide an IP multimedia service (IP multi-media service, IMS) for the terminal device. An application server (application server, AS) may be deployed in the DN, and the application server may provide the data transmission service for the terminal device.

During specific implementation, as shown in FIG. 1c, each terminal device and each network device may use a composition structure shown in FIG. 2, or include components shown in FIG. 2. FIG. 2 is a schematic diagram of composition of a communication apparatus 200 according to an embodiment of this application. The communication apparatus 200 may be a terminal device, or a chip or a system-on-a-chip in the terminal device; or may be a network device, or a chip or a system-on-a-chip in the network device. As shown in FIG. 2, the communication apparatus 200 includes a processor 201, a transceiver 202, and a communication line 203.

Further, the communication apparatus 200 may further include a memory 204. The processor 201, the memory 204, and the transceiver 202 may be connected through the communication line 203.

The processor 201 is a central processing unit (central processing unit, CPU), a general-purpose processor, a network processor (network processor, NP), a digital signal processor (digital signal processor, DSP), a microprocessor, a microcontroller, a programmable logic device (programmable logic device, PLD), or any combination thereof. Alternatively, the processor 201 may be another apparatus having a processing function, for example, a circuit, a component, or a software module. This is not limited.

The transceiver 202 is configured to communicate with another device or another communication network. The another communication network may be an Ethernet, a radio access network (radio access network, RAN), a wireless local area network (wireless local area network, WLAN), or the like. The transceiver 202 may be a module, a circuit, a transceiver, or any apparatus that can implement communication.

The communication line 203 is configured to transmit information between the components included in the communication apparatus 200.

The memory 204 is configured to store instructions. The instructions may be a computer program.

The memory 204 may be a read-only memory (read-only memory, ROM) or another type of static storage device that can store static information and/or instructions, may be a random access memory (random access memory, RAM) or another type of dynamic storage device that can store information and/or instructions, or may be an electrically erasable programmable read-only memory (electrically erasable programmable read-only memory, EEPROM), a compact disc read-only memory (compact disc read-only memory, CD-ROM) or another compact disc storage, an optical disc storage (including a compressed optical disc, a laser disc, an optical disc, a digital universal optical disc, a Blu-ray disc, or the like), a magnetic disk storage medium or another magnetic storage device, or the like. This is not limited.

It should be noted that the memory 204 may be independent of the processor 201, or may be integrated with the processor 201. The memory 204 may be configured to store instructions, program code, some data, or the like. The memory 204 may be located inside the communication apparatus 200, or may be located outside the communication apparatus 200. This is not limited. The processor 201 is configured to execute the instructions stored in the memory 204, to implement a transmission parameter obtaining method provided in the following embodiments of this application.

In an example, the processor 201 may include one or more CPUs, for example, a CPU 0 and a CPU 1 in FIG. 2.

In an optional implementation, the communication apparatus 200 includes a plurality of processors. For example, in addition to the processor 201 in FIG. 2, the communication apparatus 200 may further include a processor 207.

In an optional implementation, the communication apparatus 200 further includes an output device 205 and an input device 206. For example, the input device 206 is a device, for example, a keyboard, a mouse, a microphone, or a joystick, and the output device 205 is a device, for example, a display or a speaker (speaker).

It should be noted that the communication apparatus 200 may be a desktop computer, a portable computer, a network server, a mobile phone, a tablet computer, a wireless terminal, an embedded device, a chip system, or a device having a structure similar to a structure in FIG. 2. In addition, the composition structure shown in FIG. 3a does not constitute a limitation on the communication apparatus. In addition to the components shown in FIG. 2, the communication apparatus may include more or fewer components than components shown in the figure, combine some components, or have different component arrangements.

In this embodiment of this application, the chip system may include a chip, or may include a chip and another discrete component.

In addition, for actions, terms, and the like in embodiments of this application, refer to each other. This is not limited. In embodiments of this application, names of messages exchanged between devices, names of parameters in the messages, or the like are merely examples. Other names may alternatively be used during specific implementation. This is not limited.

The transmission parameter obtaining method provided in embodiments of this application is described below with reference to the communication system shown in FIG. 1c. A terminal device may be any terminal device in the communication system, a network device may be any network device that communicates with the terminal device in the communication system, and both the terminal device and the network device in the following embodiments may have components shown in FIG. 2.

When the terminal device is in an idle state, the terminal device and the network device may determine an intra-frequency and/or inter-frequency cell-reselection measurement threshold by using a method shown in FIG. 3a. When the terminal device is in a connected state, the terminal device and the network device may determine a radio link failure threshold by using a method shown in FIG. 4a; or the terminal device and the network device may determine an intra-frequency and/or inter-frequency connected-state measurement threshold by using a method shown in FIG. 5a.

FIG. 3a is a flowchart of a transmission parameter obtaining method according to an embodiment of this application. As shown in FIG. 3a, when a terminal device is in an idle state, the method may include the following steps.

Step 301. The terminal device obtains a transmission parameter of a network device.

In a possible design, the transmission parameter of the network device includes a distance between the terminal device and the network device.

When the terminal device is in the idle state, the terminal device may determine, at a moment, a distance between the terminal device and the network device at the moment based on location information of the network device and location information of the terminal device.

The terminal device may receive the location information of the network device that is sent by the network device. Optionally, the location information of the network device is in the transmission parameter sent by the network device.

For example, when the network device includes a flight platform, the location information of the network device may be ephemeris information. The ephemeris information may be a precise location or track table and changing with time and indicating that a space flight body (for example, the flight platform) runs, and is used to describe a location and a speed of the space flight body. The terminal device may determine parameters such as time, the location, and the speed of the space flight body based on the received ephemeris information and by using a mathematical relationship between the six orbital parameters of the Kepler's law.

It should be noted that, for specific descriptions of determining location information of the space flight body by the terminal device based on the ephemeris information, refer to a conventional technology. Details are not described.

The terminal device may further determine the location information of the terminal device by using a positioning unit of the terminal device.

The positioning unit may be a positioning unit that can position the terminal device, such as a global positioning system (global positioning system, GPS) unit or a BeiDou navigation satellite system (beidou navigation satellite system, BDS) unit. This is not limited.

In another possible design, the transmission parameter of the network device includes a height angle of the network device relative to a center of a serving cell corresponding to the terminal device.

When the terminal device is in the idle state, the terminal device may determine, at a moment based on location information of the network device, location information of the terminal device, and location information of the center of the serving cell corresponding to the terminal device, a height angle of the network device relative to the center of the serving cell corresponding to the terminal device at the moment.

The terminal device may determine the location information of the network device and the location information of the terminal device based on the foregoing description, and the terminal device may further receive the location information of the center of the serving cell that is sent by the network device. The location information of the center of the serving cell and the location information of the network device may be included in the transmission parameter, or may be separately sent to the terminal device in two pieces of information.

Figure 3B:
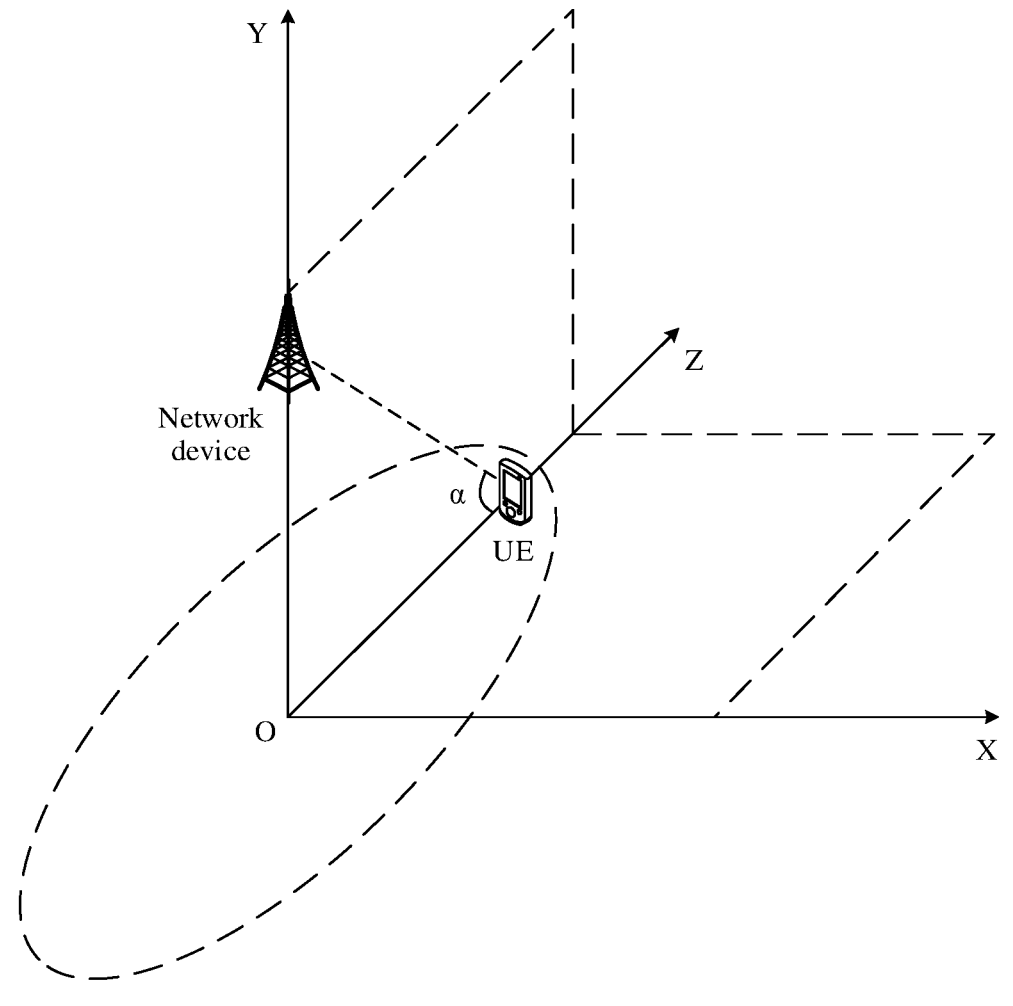
FIG. 3b is a schematic diagram of a height angle according to an embodiment of this application.

For example, refer to FIG. 3b. A terminal device UE may receive location information of a network device and location information of a coverage center O of a serving cell that are sent by the network device, determine location information of the terminal device UE, and determine, based on the location information of the network device, the location information of the terminal device, and the location information of the coverage center O, an included angle α formed by a straight line between the network device and the terminal device and a straight line between the terminal device and the coverage center O as a height angle of the network device relative to the center of the serving cell corresponding to the terminal device.

It should be noted that a smaller absolute value of a difference between a height angle value and 90 degrees indicates a shorter distance between the terminal device and the network device, and a larger absolute value of the difference between the height angle value and 90 degrees indicates a longer distance between the terminal device and the network device.

Step 302. The terminal device determines an intra-frequency and/or inter-frequency cell-reselection measurement threshold based on the transmission parameter.

For a neighboring cell that is configured as an intra-frequency cell of the serving cell, the terminal device may determine an intra-frequency cell-reselection measurement threshold based on the transmission parameter. For a neighboring cell that is configured as an inter-frequency cell or an inter-RAT cell of the serving cell, the terminal device may determine an inter-frequency cell-reselection measurement threshold based on the transmission parameter.

The terminal device may receive a cell list sent by the network device, and determine a neighboring cell based on the cell list. The cell list may include cell information of the serving cell and cell information of the neighboring cell of the serving cell. The cell information may include a cell identifier, frequency information, and the like. This is not limited.

In a possible design, when the transmission parameter includes the distance between the terminal device and the network device, the terminal device determines an intra-frequency and/or inter-frequency cell-reselection measurement threshold based on a variation of the distance in a unit time.

For example, when the variation of the distance in the unit time is less than or equal to a first value, the terminal device may use a first threshold as the intra-frequency and/or inter-frequency cell-reselection measurement threshold; or when the variation of the distance in the unit time is greater than the first value, the terminal device may use a second threshold as the intra-frequency and/or inter-frequency cell-reselection measurement threshold, where the first threshold is less than the second threshold.

The unit time may be a difference between corresponding moments at which the terminal device determines the distance between the terminal device and the network device twice consecutively. When the terminal device periodically determines the distance between the terminal device and the network device, the unit time may also be described as a period in which the terminal device determines the distance between the terminal device and the network device.

For example, a corresponding moment at which the terminal device determines the distance between the terminal device and the network device for the first time is t1, and a corresponding moment at which the terminal device determines the distance between the terminal device and the network device for the second time is t2. The terminal device may determine t2−t1 as the unit time.

For another example, the terminal device determines the distance between the terminal device and the network device by using 10 s as a period. In this case, the terminal device may determine 10 s as the unit time.

Based on the foregoing description of the unit time, the variation of the distance in the unit time may be described as a difference obtained by subtracting a distance between the terminal device and the network device that is determined by the terminal device for the first time in the unit time from a distance between the terminal device and the network device that is determined by the terminal device for the second time in the unit time. When the terminal device periodically determines the distance between the terminal device and the network device, the variation of the distance in the unit time may also be described as a difference obtained by subtracting a distance between the terminal device and the network device that is determined by the terminal device in a previous period from a distance between the terminal device and the network device that is determined by the terminal device in a current period.

For example, the distance between the terminal device and the network device is D, and the unit time is t2−t1. Assuming that the terminal device determines that the distance between the terminal device and the network device is D1 at a moment t1, and determines that the distance between the terminal device and the network device is D2 at a moment t2, the terminal device may use D2−D1 as the variation of the distance in the unit time $t2-t1$. Alternatively, the terminal device may use a ratio of $D2-D1$ to $t2-t1$, that is, $(D2-D1)/(t2-t1)$, as the variation of the distance in the unit time. In this case, the unit time may be understood as is or another time length.

For another example, the distance between the terminal device and the network device is D, and the terminal device determines the distance between the terminal device and the network device in a period of 10 s. Assuming that the terminal device determines that the distance between the terminal device and the network device is D2 in a current period, and determines that the distance between the terminal device and the network device is D1 in a previous period, the terminal device may use $D2-D1$ as the variation of the distance in the unit time of 10 s.

The terminal device may determine the variation of the distance in the unit time based on the distance between the terminal device and the network device in step 301.

The terminal device may determine, based on the first value and the variation of the distance in the unit time, whether the distance between the terminal device and the network device becomes shorter or longer. When the variation of the distance in the unit time is less than or equal to the first value, it may be determined that the distance between the terminal device and the network device becomes shorter; or when the variation of the distance in the unit time is greater than the first value, it may be determined that the distance between the terminal device and the network device becomes longer. The first value may be 0.

For example, the first value is 0, and the terminal device determines, at a moment t1, that the distance between the terminal device and the network device is 10 km, and determines, at a moment t2, that the distance between the terminal device and the network device is 8 km. It is considered that a difference between the moment t2 and the moment t1 represents the unit time. In this case, the terminal device may use 8 km–10 km=–2 km as a variation of the distance in a unit time $t2-t1$. Because –2 km is less than 0, it may be determined that the distance between the terminal device and the network device becomes shorter in a time period from t1 to t2.

For another example, the first value is 0, the terminal device determines, at a moment t2, that the distance between the terminal device and the network device is 8 km, and determines, at a moment t3, that the distance between the terminal device and the network device is 15 km. In this case, the terminal device may use 15 km–8 km=7 km as a variation of the distance in a unit time $t3-t2$. Because 7 km is greater than 0, it may be determined that the distance between the terminal device and the network device becomes longer in a time period from t2 to t3.

Optionally, the first value is greater than 0. When the first value is greater than 0, if the variation of the distance in the unit time is greater than the first value, it may be determined that the distance between the terminal device and the network device becomes longer.

For example, the first value is 2 km. It is assumed that the terminal device determines, at a moment t1, that the distance between the terminal device and the network device is 7 km, and determines, at a moment t2, that the distance between the terminal device and the network device is 13 km. In this case, the terminal device may use 13 km–7 km=6 km as a variation of the distance in a unit time $t2-t1$. Because 6 km is greater than 2 km, it may be determined that the distance between the terminal device and the network device becomes longer in a time period from t1 to t2.

Optionally, the first value is less than 0. When the first value is less than 0, if the variation of the distance in the unit time is less than or equal to the first value, it may be determined that the distance between the terminal device and the network device becomes shorter.

For example, the first value is –2 km. It is assumed that the terminal device determines, at a moment t1, that the distance between the terminal device and the network device is 7 km, and determines, at a moment t2, that the distance between the terminal device and the network device is 4 km. In this case, the terminal device may use 4 km–7 km=–3 km as a variation of the distance in a unit time $t2-t1$. Because –3 km is less than –2 km, it may be determined that the distance between the terminal device and the network device becomes shorter in a time period from t1 to t2.

It should be noted that, when the unit time is fixed, a larger absolute value of the variation of the distance in the unit time indicates a faster change speed of the distance between the terminal device and the network device.

When the distance between the terminal device and the network device becomes shorter, the terminal device may use the first threshold that is smaller as the intra-frequency and/or inter-frequency cell-reselection measurement threshold, to prevent the terminal device from triggering intra-frequency and/or inter-frequency cell-reselection measurement excessively early, thereby facilitating energy saving of the terminal device. When the distance between the terminal device and the network device becomes longer, the terminal device may use the second threshold that is larger as the intra-frequency and/or inter-frequency cell-reselection measurement threshold, to prevent the terminal device from triggering intra-frequency and/or inter-frequency cell-reselection measurement excessively late, thereby improving reliability of a communication system.

For example, the terminal device may determine the first threshold and the second threshold in either of the following manners 1 and 2:

Manner 1: The first threshold and the second threshold are preconfigured.

Optionally, the terminal device receives the first threshold and the second threshold that are sent by the network device.

The terminal device may receive system information (system information, SI) sent by the network device, where the system information includes the first threshold and the second threshold.

Alternatively, the terminal device determines the first threshold or the second threshold according to a preconfigured communication protocol.

It should be noted that, for the neighboring cell that is configured as an intra-frequency cell of the serving cell, both the first threshold and the second threshold are intra-frequency cell reselection measurement thresholds. For the neighboring cell that is configured as an inter-frequency cell or an inter-RAT cell of the serving cell, both the first threshold and the second threshold are inter-frequency cell-reselection measurement thresholds.

Manner 2: The first threshold and the second threshold are determined by the terminal device through calculation.

The terminal device may determine the first threshold and the second threshold based on a preset measurement threshold and an offset.

The terminal device may use a difference between the preset measurement threshold and the offset as the first threshold, and use a sum of the preset measurement threshold and the offset as the second threshold. Alternatively, the terminal device may use a difference between the preset measurement threshold and the offset as the first threshold, and use the preset measurement threshold as the second threshold. Alternatively, the terminal device may use the preset measurement threshold as the first threshold, and use a sum of the preset measurement threshold and the offset as the second threshold. This is not limited.

Optionally, the terminal device receives the preset measurement threshold sent by the network device, the terminal device determines the preset measurement threshold according to a preconfigured communication protocol, or the terminal device determines the preset measurement threshold by itself. This is not limited.

Optionally, the terminal device receives the offset sent by the network device, the terminal device determines the offset according to a preconfigured communication protocol, or the terminal device determines the offset by itself. This is not limited.

Optionally, the preset measurement threshold and the offset may be sent in a same message, or may be separately sent to the terminal device in different messages.

It should be noted that, for the neighboring cell that is configured as an intra-frequency cell of the serving cell, the preset measurement threshold is a preset intra-frequency measurement threshold, the offset is an intra-frequency offset, and both the first threshold and the second threshold obtained through calculation are intra-frequency cell-rese-lection measurement thresholds. For the neighboring cell that is configured as an inter-frequency cell or an inter-RAT cell of the serving cell, the preset measurement threshold is a preset inter-frequency measurement threshold, the offset is an inter-frequency offset, and both the first threshold and the second threshold obtained through calculation are inter-frequency cell-reselection measurement thresholds.

When determining the first threshold and the second threshold, the terminal device may obtain a first threshold 1 and a second threshold 1 based on the preset intra-frequency measurement threshold and the intra-frequency offset, and obtain a first threshold 2 and a second threshold 2 based on the preset inter-frequency measurement threshold and the inter-frequency offset. The first threshold 1 and the second threshold 1 are intra-frequency cell-reselection measure-ment thresholds, and the first threshold 2 and the second threshold 2 are inter-frequency cell-reselection measure-ment thresholds.

In another possible design, when the transmission param-eter includes the height angle of the network device relative to the center of the serving cell corresponding to the terminal device, the terminal device determines the intra-frequency and/or inter-frequency cell-reselection measurement thresh-old based on the height angle.

The terminal device may determine, based on the height angle of the network device relative to the center of the serving cell, an intra-frequency and/or inter-frequency cell-reselection measurement threshold corresponding to a cur-rent height angle from a prestored mapping relationship between a height angle and an intra-frequency and/or inter-frequency cell-reselection measurement threshold.

For example, refer to the following Table 3. The terminal may pre-store a mapping relationship between a height angle range and an intra-frequency and/or inter-frequency cell-reselection measurement threshold.

TABLE 3

| Height angle range 1 | Intra-frequency and/or inter-frequency cell-reselection measurement threshold 1 |
| Height angle range 2 | Intra-frequency and/or inter-frequency cell-reselection measurement threshold 2 |

TABLE 3-continued

| Height angle range 3 | Intra-frequency and/or inter-frequency cell-reselection measurement threshold 3 |
| Height angle range 4 | Intra-frequency and/or inter-frequency cell-reselection measurement threshold 4 |

The mapping relationship between a height angle and an intra-frequency and/or inter-frequency cell-reselection mea-surement threshold may include a mapping relationship between a height angle and an intra-frequency cell-reselec-tion measurement threshold and/or a mapping relationship between a height angle and an inter-frequency cell-reselec-tion measurement threshold. For the neighboring cell that is configured as an intra-frequency cell of the serving cell, the terminal device may determine, based on the mapping relationship between a height angle and an intra-frequency cell-reselection measurement threshold, an intra-frequency cell-reselection measurement threshold corresponding to the current height angle. For the neighboring cell that is con-figured as an inter-frequency cell of the serving cell, the terminal device may determine, based on the mapping relationship between a height angle and an inter-frequency cell-reselection measurement threshold, an inter-frequency cell-reselection measurement threshold corresponding to the current height angle.

Optionally, the terminal device receives a mapping rela-tionship that is between a height angle and an intra-fre-quency and/or inter-frequency cell-reselection measurement threshold and that is sent by the network device and stores the mapping relationship; or the terminal device determines a mapping relationship between a height angle and an intra-frequency and/or inter-frequency cell-reselection mea-surement threshold according to a preconfigured communi-cation protocol and stores the mapping relationship.

The terminal may receive system information sent by the network device, and determine, based on the system infor-mation, the mapping relationship between a height angle and an intra-frequency and/or inter-frequency cell-reselection measurement threshold. The system information includes the mapping relationship between a height angle and an intra-frequency and/or inter-frequency cell-reselection mea-surement threshold.

It should be noted that the terminal device may determine the distance between the terminal device and the network device or a change trend of the distance based on the height angle. A smaller absolute value of a difference between a height angle value and 90 degrees indicates a shorter dis-tance between the terminal device and the network device; and a larger absolute value of the difference between the height angle value and 90 degrees indicates a longer distance between the terminal device and the network device. A gradually decreasing absolute value of a difference between a height angle value and 90 degrees indicates that the distance between the terminal device and the network device becomes shorter; and a gradually increasing absolute value of the difference between the height angle value and 90 degrees indicates that the distance between the terminal device and the network device becomes longer.

For example, a height angle determined by the terminal device at a moment t1 is 60°, and a height angle determined at a moment t2 is 30°. Because $|60°-90°|<|30°-90°|$, the terminal device may determine that a distance between the terminal device and the network device at the moment t2 is longer than that at the moment t1, and a distance between the terminal device and the network device is increasingly long in a time period from t1 to t2.

For another example, a height angle determined by the terminal device at a moment t2 is 30°, and a height angle determined at a moment t3 is 90°. Because |30°-90°|<|90°-90°|, the terminal device may determine that a distance between the terminal device and the network device at the moment t3 is shorter than that at the moment t2, and a distance between the terminal device and the network device is increasingly short in a time period from t2 to t3.

When the absolute value of the difference between the height angle value and 90 degrees is smaller, the intra-frequency and/or inter-frequency cell-reselection measurement threshold may be set to a smaller value, to prevent the terminal device from triggering intra-frequency and/or inter-frequency cell-reselection measurement excessively early, thereby facilitating energy saving of the terminal device. When the absolute value of the difference between the height angle value and 90 degrees is larger, the intra-frequency and/or inter-frequency cell-reselection measurement threshold may be set to a larger value, to prevent the terminal device from triggering intra-frequency and/or inter-frequency cell-reselection measurement excessively late, thereby improving reliability of the communication system.

When the height angle value gradually approaches 90 degrees, that is, the absolute value of the difference between the height angle value and 90 degrees gradually becomes smaller, the intra-frequency and/or inter-frequency cell-reselection measurement threshold may be set to a smaller value, to prevent the terminal device from triggering intra-frequency and/or inter-frequency cell-reselection measurement excessively early, thereby facilitating energy saving of the terminal device. When the height angle value gradually differs 90 degrees, that is, the absolute value of the difference between the height angle value and 90 degrees gradually becomes larger, the intra-frequency and/or inter-frequency cell-reselection measurement threshold may be set to a higher value, to prevent the terminal device from triggering intra-frequency and/or inter-frequency cell-reselection measurement excessively late, thereby improving reliability of the communication system.

Step 303. The terminal device determines, based on the intra-frequency and/or inter-frequency cell-reselection measurement threshold, whether to trigger intra-frequency and/or inter-frequency cell-reselection measurement.

The terminal device may determine, based on the foregoing description of cell reselection, whether to trigger intra-frequency and/or inter-frequency cell-reselection measurement based on the intra-frequency and/or inter-frequency cell-reselection measurement threshold and a channel status that is obtained by the terminal device through measurement in the serving cell.

The terminal device may trigger intra-frequency and/or inter-frequency cell-reselection measurement when the channel status of the terminal device is lower than the intra-frequency and/or inter-frequency cell-reselection measurement threshold.

Based on the method shown in FIG. 3a, the terminal device may dynamically determine the intra-frequency and/or inter-frequency cell-reselection measurement threshold based on the location information of the network device, to improve flexibility of determining the intra-frequency and/or inter-frequency cell-reselection measurement threshold. The terminal device properly uses different thresholds when the network device is in different locations, so that the terminal device can be prevented from triggering intra-frequency and/or inter-frequency cell-reselection measurement excessively early or excessively late, thereby improving reliability of the communication system and facilitating energy saving of the terminal device.

In the method shown in FIG. 3a, the terminal device may determine, based on the channel status of the terminal device and the intra-frequency and/or inter-frequency cell-reselection measurement threshold, whether to trigger intra-frequency and/or inter-frequency cell-reselection measurement according to step 303. Alternatively, the terminal device may determine, based on a location of the terminal device in the serving cell, whether to trigger intra-frequency and/or inter-frequency cell-reselection measurement according to the following step 304; or the terminal device may determine, based on a distance between the network device and the center of the serving cell and the intra-frequency and/or inter-frequency cell reselection threshold, whether to trigger intra-frequency and/or inter-frequency cell-reselection measurement according to the following step 305.

Step 304. The terminal device determines, based on the location of the terminal device in the serving cell, whether to trigger intra-frequency and/or inter-frequency cell-reselection measurement.

The terminal device may trigger intra-frequency and/or inter-frequency cell-reselection measurement when the terminal device is located at an edge of the serving cell.

For example, the terminal device may determine, based on the location information of the terminal device and coverage information of the serving cell (for example, location information of the center of the serving cell and a coverage radius of the serving cell), whether the terminal device is located at the edge of the serving cell.

Figure 3C:
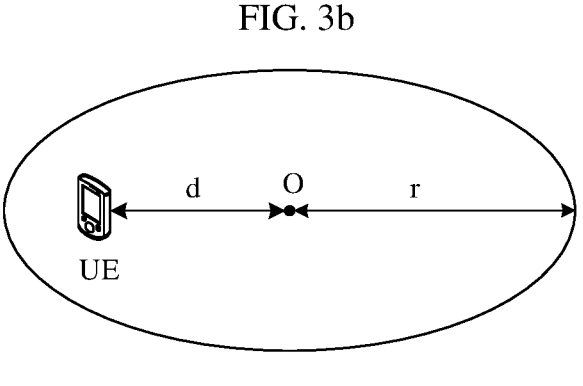
FIG. 3c is a diagram of a composition structure of a serving cell according to an embodiment of this application.

For example, refer to FIG. 3c. The terminal device UE may determine a distance d between the terminal device UE and a coverage center O of the serving cell based on the location information of the terminal device UE and location information of the coverage center O of the serving cell, and determine that the terminal device is located at the edge of the serving cell when the distance d is greater than a preset value, where the preset value is less than or equal to a coverage radius r of the serving cell.

Optionally, the terminal device receives the coverage information of the serving cell sent by the network device, where the coverage information of the serving cell includes the location information of the center of the serving cell and the coverage radius of the serving cell.

The terminal device may determine the coverage information of the serving cell based on system information sent by the network device.

Optionally, the terminal device receives the preset value corresponding to the serving cell that is sent by the network device.

The terminal device may determine the preset value of the serving cell based on a broadcast message sent by the network device.

Optionally, the terminal device further determines the coverage information of the serving cell and/or the preset value of the serving cell according to a preconfigured communication protocol.

Based on step 304, the terminal device may trigger intra-frequency and/or inter-frequency cell-reselection measurement when the terminal device is located at the edge of the serving cell, to avoid unnecessary power consumption caused because no suitable neighboring cell is found when the terminal device starts intra-frequency and/or inter-frequency cell-reselection measurement at the center of the serving cell, thereby facilitating energy saving of the terminal device. In addition, a quantity of times that the terminal device triggers intra-frequency and/or inter-frequency cell-reselection measurement can be reduced, thereby improving flexibility of intra-frequency and/or inter-frequency cell-reselection measurement, and improving efficiency of intra-frequency and/or inter-frequency cell-reselection measurement.

Step 305. The terminal device determines, based on the distance between the network device and the center of the serving cell and the intra-frequency and/or inter-frequency cell-reselection measurement threshold, whether to trigger intra-frequency and/or inter-frequency cell-reselection measurement.

The terminal device may determine, when the distance between the network device and the center of the serving cell is the shortest and based on the intra-frequency and/or inter-frequency cell-reselection measurement threshold, whether to trigger intra-frequency and/or inter-frequency cell-reselection measurement.

For example, the terminal device may record, based on the location information of the network device and the location information of the center of the serving cell, the location information of the network device when the distance between the network device and the center of the serving cell is the shortest. When the network device moves to a location corresponding to the location information, the terminal device determines, based on a current channel status and the intra-frequency and/or inter-frequency cell-reselection measurement threshold, whether to trigger intra-frequency and/or inter-frequency cell-reselection measurement.

For example, refer to FIG. 1*a*. An example in which the network device is disposed on a satellite is used. It is assumed that when the terminal device determines, based on the location information of the network device and the location information of the center of the serving cell, that the distance between the network device and the center of the serving cell is the shortest, the network device is located at a point B. In this case, each time the network device moves to the point B, the terminal device may determine, based on a channel status obtained at the point B through measurement and the intra-frequency and/or inter-frequency cell-reselection measurement threshold, whether to trigger intra-frequency cell-reselection measurement.

For another example, when the network device periodically moves, the terminal device may record, based on the location information of the network device and the location information of the center of the serving cell, a location of a current moment in a period when the distance between the network device and the center of the serving cell is the shortest. When the network device periodically moves, it may be determined, based on a location, corresponding to a shortest distance between the network device and the center of the serving cell, of a moment in a period and based on a channel status corresponding to the location and the intra-frequency and/or inter-frequency cell-reselection measurement threshold, whether to trigger intra-frequency and/or inter-frequency cell-reselection measurement.

For example, the network device periodically moves according to a period of 10 h. Assuming that the network device is closest to the center of the serving cell at the fifth hour of each period, the network device may determine, at the fifth hour of each period based on the intra-frequency and/or inter-frequency cell-reselection measurement threshold and a channel status that is obtained through measurement at this moment, whether to trigger intra-frequency and/or inter-frequency cell-reselection measurement.

Based on step 305, when the distance between the network device and the center of the serving cell is the shortest, the terminal device may determine, based on the intra-frequency and/or inter-frequency cell-reselection measurement threshold, whether to trigger intra-frequency and/or inter-frequency cell-reselection measurement, thereby reducing a quantity of times that the terminal device triggers intra-frequency and/or inter-frequency cell-reselection measurement, and improving flexibility of intra-frequency and/or inter-frequency cell-reselection measurement efficiency.

It should be noted that, the terminal device may determine, based on one or more of step 303, step 304, or step 305, whether to trigger intra-frequency and/or inter-frequency cell-reselection measurement. This is not limited.

When the terminal device determines, based on a plurality of steps in step 303, step 304, or step 305, whether to trigger intra-frequency and/or inter-frequency cell-reselection measurement, there is no limitation on an execution sequence of at least two steps used to determine whether to trigger intra-frequency and/or inter-frequency cell-reselection measurement. Some of the at least two steps may be first performed and then remaining steps of the at least two steps may be performed, or the at least two steps may be simultaneously performed. This is not limited.

Based on the method shown in FIG. 3*a*, as shown in FIG. 3*d*, step 301 and step 302 may be alternatively replaced with step 301*a* and step 302*a*. The terminal device may determine the intra-frequency and/or inter-frequency cell-reselection measurement threshold based on the channel status of the terminal device in the serving cell according to step 301*a* and step 302*a*.

FIG. 3*d* is a flowchart of a transmission parameter obtaining method according to an embodiment of this application. As shown in FIG. 3*d*, when a terminal device is in an idle state, the method may include the following steps.

Step 301*a*. The terminal device measures a channel status of the terminal device in a serving cell.

The channel status may include one or more of parameters such as RSRP, RSRQ, an SNR, and an SINR, or may include another parameter indicating the channel status of the terminal device in the serving cell. This is not limited.

For a specific process in which the terminal device measures the channel status, refer to a process in which the terminal device measures the channel status in a conventional technology. Details are not described.

Step 302*a*. The terminal device determines an intra-frequency and/or inter-frequency cell-reselection measurement threshold based on the channel status.

The terminal device may determine the intra-frequency/inter-frequency cell-reselection measurement threshold based on a variation of the channel status in a unit time.

For example, when the variation of the channel status in the unit time is greater than or equal to a third value, the terminal device may use a fifth threshold as the intra-frequency and/or inter-frequency cell-reselection measurement threshold; or when the variation of the channel status in the unit time is less than the third value, the terminal device may use a sixth threshold as the intra-frequency and/or inter-frequency cell-reselection measurement threshold, where the fifth threshold is less than the sixth threshold.

The unit time may be a difference between corresponding moments at which the terminal device determines the channel status twice consecutively. When the terminal device periodically determines the channel status, the unit time may also be described as a period in which the terminal device determines the channel status.

For example, a corresponding moment at which the terminal device determines the channel status for the first time is t1, and a corresponding moment at which the terminal device determines the channel status for the second time is t2. The terminal device may determine t2–t1 as the unit time.

For another example, the terminal device determines the channel status by using 10 s as a period. In this case, the terminal device may determine 10 s as the unit time.

According to the foregoing description of the unit time, the variation of the channel status in the unit time may be described as a difference obtained by subtracting a channel status determined by the terminal device for the first time in the unit time from a channel status determined by the terminal device for the second time in the unit time. When the terminal device periodically determines the channel status, the variation of the channel status in the unit time may also be described as a difference obtained by subtracting a channel status determined by the terminal device in a previous period from a channel status determined by the terminal device in a current period.

For example, RSRP is used to represent the channel status of the terminal device, and the unit time is t2–t1. Assuming that the terminal device determines that the channel status is RSRP1 at a moment t1 and determines that the channel status is RSRP2 at a moment t2, the terminal device may use RSRP2–RSRP1 as a variation of the channel status in the unit time t2–t1.

For another example, RSRP is used to represent the channel status of the terminal device, and the terminal device determines the channel status in a period of 10 s. Assuming that the terminal device determines that the channel status is RSRP2 in a current period and determines that the channel status is RSRP1 in a previous period, the terminal device may use RSRP2–RSRP1 as a variation of the channel status in a unit time of 10 s.

The terminal device may determine the variation of the channel status in the unit time based on the channel status obtained by the terminal device through measurement in step 301*a*.

The terminal device may determine, based on the variation of the channel status in the unit time and the third value, whether the channel status of the terminal device becomes better or poorer. When the variation of the channel status in the unit time is greater than or equal to the third value, it may be determined that the channel status of the terminal device becomes better. When the variation of the channel status in the unit time is less than the third value, it may be determined that the channel status of the terminal device becomes poorer. That the channel status of the terminal device becomes better may also be understood as that a distance between the terminal device and a network device becomes shorter. That the channel status of the terminal device becomes poorer may also be understood as that the distance between the terminal device and the network device becomes longer. This is not limited. The third value may be 0.

For example, the third value is 0, and RSRP is used to represent the channel status of the terminal device. Assuming that the terminal device determines that the RSRP is 10 dBm at a moment t1, and determines that the RSRP is 8 dBm at a moment t2, the terminal device may use 8 dBm–10 dBm=–2 dBm as a variation of the channel status in a unit time t2–t1. Because –2 dBm is less than 0, it may be determined that the channel status becomes poorer in a time period from t1 to t2.

For another example, the third value is 0, and RSRP is used to represent the channel status of the terminal device. Assuming that the terminal device determines that the RSRP is 8 dBm at a moment t2, and determines that the RSRP is 15 dBm at a moment t3, the terminal device may use 15 dBm–8 dBm=7 dBm as a variation of the channel status in a unit time t3–t2. Because 7 dBm is greater than 0, it may be determined that the channel status becomes better in a time period from t2 to t3.

Optionally, the third value is greater than 0. When the third value is greater than 0, if the variation of the channel status in the unit time is greater than the third value, it may be determined that the channel status becomes better.

For example, the third value is 2 dBm, and RSRP is used to represent the channel status of the terminal device. Assuming that the terminal device determines that the RSRP is 7 dBm at a moment t1, and determines that the RSRP is 13 dBm at a moment t2, the terminal device may use 13 dBm–7 dBm=6 dBm as a variation of the channel status in a unit time t2–t1. Because 6 dBm is greater than 2 dBm, it may be determined that the channel status becomes better in a time period from t1 to t2.

Optionally, the third value is less than 0. When the third value is less than 0, if the variation of the channel status in the unit time is less than or equal to the third value, it may be determined that the channel status becomes poorer.

For example, the third value is –2 dBm, and RSRP is used to represent the channel status of the terminal device. Assuming that the terminal device determines that the RSRP is 7 dBm at a moment t1, and determines that the RSRP is 4 dBm at a moment t2, the terminal device may use 4 dBm–7 dBm=–3 dBm as a variation of the channel status in a unit time t2–t1. Because –3 dBm is less than –2 dBm, it may be determined that the channel status becomes poorer in a time period from t1 to t2.

It should be noted that, when the unit time is fixed, a larger absolute value of the variation of the channel status in the unit time indicates a faster change speed of the channel status.

When the channel status of the terminal device becomes better, the terminal device may use the fifth threshold that is smaller as the intra-frequency and/or inter-frequency cell-reselection measurement threshold, to prevent the terminal device from triggering intra-frequency and/or inter-frequency cell-reselection measurement excessively early, thereby facilitating energy saving of the terminal device. When the channel status of the terminal device becomes poorer, the terminal device may use the sixth threshold that is larger as the intra-frequency and/or inter-frequency cell-reselection measurement threshold, to prevent the terminal device from triggering intra-frequency and/or inter-frequency cell-reselection measurement excessively late, thereby improving reliability of a communication system.

For a manner in which the terminal device determines the fifth threshold and the sixth threshold, refer to the manner of determining the first threshold and the second threshold in step 302. Details are not described again.

Optionally, the first threshold is the same as the fifth threshold, and the second threshold is the same as the sixth threshold.

It should be noted that for a description of the fifth threshold, refer to the description of the first threshold in step 302, and for a description of the sixth threshold, refer to the description of the second threshold in step 302. Details are not described again.

Based on the method shown in FIG. 3*d*, the terminal device may dynamically determine the intra-frequency and/or inter-frequency cell-reselection measurement threshold based on the channel status of the terminal device, to improve flexibility of determining the intra-frequency and/or inter-frequency cell-reselection measurement threshold.

The terminal device properly uses different thresholds based on different channel statuses of the terminal device, so that the terminal device can be prevented from triggering intra-frequency and/or inter-frequency cell-reselection measurement excessively early or excessively late, thereby improving reliability of the communication system and facilitating energy saving of the terminal device.

FIG. 4a is a flowchart of a transmission parameter obtaining method according to an embodiment of this application. As shown in FIG. 4a, when a terminal device is in a connected state, the method may include the following steps.

Step 401. The terminal device obtains a transmission parameter of a network device.

In a possible design, the transmission parameter of the network device includes a distance between the terminal device and the network device.

When the terminal device is in the connected state, the terminal device may determine, at a moment, a distance between the terminal device and the network device at the moment based on location information of the network device and location information of the terminal device.

For a specific description of determining, by the terminal device, the distance between the terminal device and the network device, refer to the description of determining, by the terminal device, the distance between the terminal device and the network device in step 301. Details are not described again.

Step 402. The terminal device determines a radio link failure threshold based on the transmission parameter.

In a possible design, when the transmission parameter includes the distance between the terminal device and the network device, the terminal device determines the radio link failure threshold based on a variation of the distance in a unit time.

For example, when the variation of the distance in the unit time is less than or equal to a second value, the terminal device may use a third threshold as the radio link failure threshold; or when the variation of the distance in the unit time is greater than the second value, the terminal device may use a fourth threshold as the radio link failure threshold, where the third threshold is greater than the fourth threshold.

For a description of the unit time and a description of the variation of the distance in the unit time, refer to description of the unit time and the variation of the distance in the unit time in step 302. Details are not described again.

The terminal device may determine the variation of the distance in the unit time based on the distance between the terminal device and the network device in step 401.

The terminal device may determine, based on the second value and the variation of the distance in the unit time, whether the distance between the terminal device and the network device becomes shorter or longer. When the variation of the distance in the unit time is less than or equal to the second value, it may be determined that the distance between the terminal device and the network device becomes shorter; or when the variation of the distance in the unit time is greater than the second value, it may be determined that the distance between the terminal device and the network device becomes longer. The second value may be 0.

For example, the second value is 0. It is assumed that the terminal device determines, at a moment t1, that the distance between the terminal device and the network device is 10 km, and determines, at a moment t2, that the distance between the terminal device and the network device is 8 km. In this case, the terminal device may use 8 km−10 km=−2 km as a variation of the distance in a unit time t2−t1.

Because −2 km is less than 0, it may be determined that the distance between the terminal device and the network device becomes shorter in a time period from t1 to t2.

For another example, the second value is 0, the terminal device determines, at a moment t2, that the distance between the terminal device and the network device is 8 km, and determines, at a moment t3, that the distance between the terminal device and the network device is 15 km. In this case, the terminal device may use 15 km−8 km=7 km as a variation of the distance in a unit time t3−t2. Because 7 km is greater than 0, it may be determined that the distance between the terminal device and the network device becomes longer in a time period from t2 to t3.

Optionally, the second value is greater than 0. When the second value is greater than 0, if the variation of the distance in the unit time is greater than the second value, it may be determined that the distance between the terminal device and the network device becomes longer.

For example, the second value is 2 km. It is assumed that the terminal device determines, at a moment t1, that the distance between the terminal device and the network device is 7 km, and determines, at a moment t2, that the distance between the terminal device and the network device is 13 km. In this case, the terminal device may use 13 km−7 km=6 km as a variation of the distance in a unit time t2−t1. Because 6 km is greater than 2 km, it may be determined that the distance between the terminal device and the network device becomes longer in a time period from t1 to t2.

Optionally, the second value is less than 0. When the second value is less than 0, if the variation of the distance in the unit time is less than or equal to the second value, it may be determined that the distance between the terminal device and the network device becomes shorter.

For example, the second value is −2 km. It is assumed that the terminal device determines, at a moment t1, that the distance between the terminal device and the network device is 7 km, and determines, at a moment t2, that the distance between the terminal device and the network device is 4 km. In this case, the terminal device may use 4 km−7 km=−3 km as a variation of the distance in a unit time t2−t1. Because −3 km is less than −2 km, it may be determined that the distance between the terminal device and the network device becomes shorter in a time period from t1 to t2.

It should be noted that, when the unit time is fixed, a larger absolute value of the variation of the distance in the unit time indicates a faster change speed of the distance between the terminal device and the network device.

When the distance between the terminal device and the network device becomes shorter, the terminal device may use the third threshold that is larger as the radio link failure threshold, to prevent the terminal device from triggering intra-frequency and/or inter-frequency cell-reselection measurement excessively early, thereby facilitating energy saving of the terminal device. When the distance between the terminal device and the network device becomes longer, the terminal device may use the fourth threshold that is smaller as the radio link failure threshold, to prevent the terminal device from triggering intra-frequency and/or inter-frequency cell-reselection measurement excessively late, thereby improving reliability of a communication system.

For example, the terminal device may determine the third threshold and the fourth threshold from at least two groups of preconfigured radio link failure thresholds.

When the radio link failure threshold includes a physical layer reporting threshold, the terminal device may determine a group of radio link failure thresholds with lower physical layer reporting thresholds as the third threshold, and determine a group of radio link failure thresholds with higher physical layer reporting thresholds as the fourth threshold. When the radio link failure threshold includes a physical layer failure detection quantity and timer, the terminal device may determine a group of radio link failure thresholds with larger values of a physical layer failure detection quantity and timer as the third threshold, and determine a group of radio link failure thresholds with smaller values of a physical layer failure detection quantity and timer as the fourth threshold. When the radio link failure threshold includes a maximum RLC layer retransmission quantity, the terminal device may determine a group of radio link thresholds with a larger maximum RLC layer retransmission quantity as the third threshold, and determine a group of radio link failure thresholds with a smaller maximum RLC layer retransmission quantity as the fourth threshold. When the radio link failure threshold includes a maximum MAC layer random access preamble transmission quantity, the terminal device may determine a group of radio link thresholds with a larger maximum MAC layer random access preamble transmission quantity as the third threshold, and determine a group of radio link failure thresholds with a smaller maximum MAC layer random access preamble transmission quantity as the fourth threshold.

Optionally, the terminal device receives the at least two groups of radio link failure thresholds sent by the network device.

The terminal device may determine the at least two groups of radio link failure thresholds based on system information sent by the network device.

Step 403. The terminal device determines, based on the radio link failure threshold, whether to trigger the radio link failure procedure.

The terminal device may determine, based on the foregoing description of the radio link failure procedure and based on the radio link failure threshold and a channel status that is obtained by the terminal device through measurement in a serving cell, whether to trigger the radio link failure procedure.

The terminal device may trigger the radio link failure procedure when the channel status of the terminal device meets the radio link failure threshold.

Based on the method shown in FIG. 4*a*, the terminal device may dynamically determine the radio link failure threshold based on the location information of the network device, to improve flexibility of determining the radio link failure threshold. The terminal device properly uses different thresholds when the network device is in different locations, so that the terminal device can be prevented from triggering the radio link failure procedure excessively early or excessively late, thereby improving reliability of the communication system and facilitating energy saving of the terminal device.

Based on the method shown in FIG. 4*a*, as shown in FIG. 4*b*, step 401 and step 402 may be alternatively replaced with step 401*a* and step 402*a*. That is, the terminal device may determine the radio link failure threshold based on the channel status of the terminal device in the serving cell according to step 401*a* and step 402*a*.

FIG. 4*b* is a flowchart of a transmission parameter obtaining method according to an embodiment of this application. As shown in FIG. 4*b*, when a terminal device is in a connected state, the method may include the following steps.

Step 401*a*. The terminal device measures a channel status of the terminal device in a serving cell.

For a description of step 401*a*, refer to the specific description of step 301*a*. Details are not described again.

Step 402*a*. The terminal device determines a radio link failure threshold based on the channel status.

The terminal device may determine the radio link failure threshold based on a variation of the channel status in a unit time.

For example, when the variation of the channel status in the unit time is greater than or equal to a fourth value, the terminal device may use a seventh threshold as the radio link failure threshold; or when the variation of the channel status in the unit time is less than the fourth value, the terminal device may use an eighth threshold as the radio link failure threshold, where the seventh threshold is greater than the eighth threshold.

For a description of the unit time and a description of the variation of the channel status in the unit time, refer to the description of the unit time and the variation of the channel status in the unit time in step 302*a*. Details are not described again.

Specifically, the terminal device may determine the variation of the channel status in the unit time based on the channel status obtained by the terminal device through measurement in step 401*a*.

The terminal device may determine, based on the variation of the channel status in the unit time and the fourth value, whether the channel status of the terminal device becomes better or poorer. When the variation of the channel status in the unit time is greater than or equal to the fourth value, it may be determined that the channel status of the terminal device becomes better. When the variation of the channel status in the unit time is less than the fourth value, it may be determined that the channel status of the terminal device becomes poorer. That the channel status of the terminal device becomes better may also be understood as that a distance between the terminal device and a network device becomes shorter. That the channel status of the terminal device becomes poorer may also be understood as that the distance between the terminal device and the network device becomes longer. This is not limited. The fourth value may be 0.

For example, the fourth value is 0, and RSRP is used to represent the channel status of the terminal device. Assuming that the terminal device determines that the RSRP is 10 dBm at a moment t1, and determines that the RSRP is 8 dBm at a moment t2, the terminal device may use 8 dBm−10 dBm=−2 dBm as a variation of the channel status in a unit time t2−t1. Because −2 dBm is less than 0, it may be determined that the channel status becomes poorer in a time period from t1 to t2.

For another example, the fourth value is 0, and RSRP is used to represent the channel status of the terminal device. Assuming that the terminal device determines that the RSRP is 8 dBm at a moment t2, and determines that the RSRP is 15 dBm at a moment t3, the terminal device may use 15 dBm−8 dBm=7 dBm as a variation of the channel status in a unit time t3−t2. Because 7 dBm is greater than 0, it may be determined that the channel status becomes better in a time period from t2 to t3.

Optionally, the fourth value is greater than 0. When the fourth value is greater than 0, if the variation of the channel status in the unit time is greater than the fourth value, it may be determined that the channel status becomes better.

For example, the fourth value is 2 dBm, and RSRP is used to represent the channel status of the terminal device. Assuming that the terminal device determines that the RSRP is 7 dBm at a moment t1, and determines that the RSRP is 13 dBm at a moment t2, the terminal device may use 13 dBm−7 dBm=6 dBm as a variation of the channel status in a unit time t2–t1. Because 6 dBm is greater than 2 dBm, it may be determined that the channel status becomes better in a time period from t1 to t2.

Optionally, the fourth value is less than 0. When the fourth value is less than 0, if the variation of the channel status in the unit time is less than or equal to the fourth value, it may be determined that the channel status becomes poorer.

For example, the fourth value is –2 dBm, and RSRP is used to represent the channel status of the terminal device. Assuming that the terminal device determines that the RSRP is 7 dBm at a moment t1, and determines that the RSRP is 4 dBm at a moment t2, the terminal device may use 4 dBm–7 dBm=–3 dBm as a variation of the channel status in a unit time t2–t1. Because –3 dBm is less than –2 dBm, it may be determined that the channel status becomes poorer in a time period from t1 to t2.

It should be noted that, when the unit time is fixed, a larger absolute value of the variation of the channel status in the unit time indicates a faster change speed of the channel status.

When the channel status of the terminal device becomes better, the terminal device may use the seventh threshold that is larger as the radio link failure threshold, to prevent the terminal device from triggering a radio link failure procedure excessively early, thereby facilitating energy saving of the terminal device. When the channel status of the terminal device becomes poorer, the terminal device may use the eighth threshold that is smaller as the radio link failure threshold, to prevent the terminal device from triggering a radio link failure procedure excessively late, thereby improving reliability of a communication system.

For a manner in which the terminal device determines the seventh threshold and the eighth threshold, refer to the manner in which the terminal device determines the fourth threshold and the fifth threshold in step 402. Details are not described again.

Optionally, the fourth threshold is the same as the seventh threshold, and the fifth threshold is the same as the eighth threshold.

It should be noted that for a description of the seventh threshold, refer to the description of the fourth threshold in step 402, and for a description of the eighth threshold, refer to the description of the fifth threshold in step 402. Details are not described again.

Based on the method shown in FIG. 4b, the terminal device may dynamically determine the radio link failure threshold based on the channel status of the terminal device, to improve flexibility of determining the radio link failure threshold. The terminal device properly uses different thresholds based on different channel statuses of the terminal device, so that the terminal device can be prevented from triggering the radio link failure procedure excessively early or excessively late, thereby improving reliability of the communication system and facilitating energy saving of the terminal device.

Figures 5A, 5B:
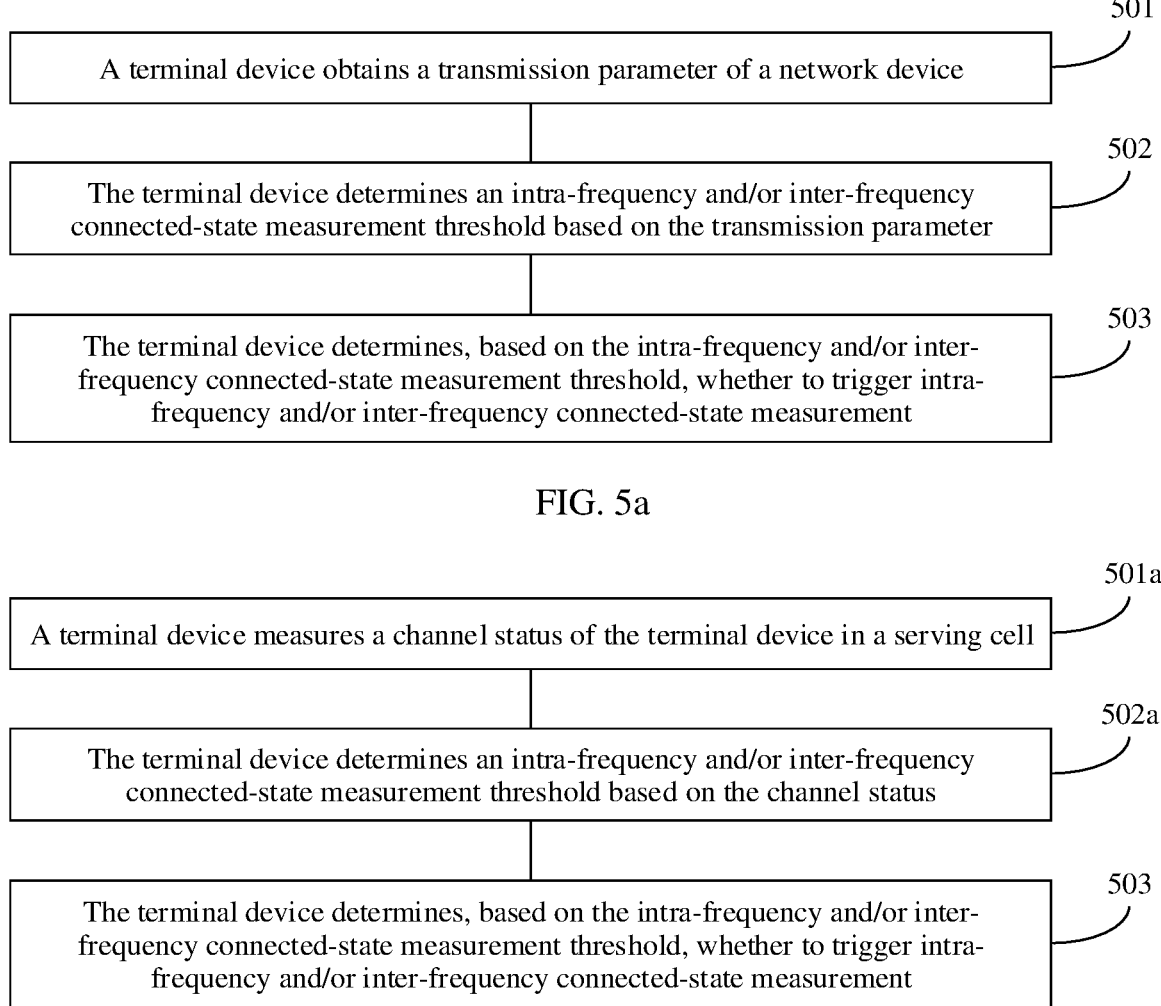
FIG. 5a is a flowchart of a transmission parameter obtaining method according to an embodiment of this application.
FIG. 5b is a flowchart of a transmission parameter obtaining method according to an embodiment of this application.

FIG. 5a is a flowchart of a transmission parameter obtaining method according to an embodiment of this application. As shown in FIG. 5a, when a terminal device is in a connected state, the method may include the following steps.

Step 501. The terminal device obtains a transmission parameter of a network device.

In a possible design, the transmission parameter of the network device includes a height angle of the network device relative to a center of a serving cell corresponding to the terminal device.

When the terminal device is in the connected state, the terminal device may determine, at a moment based on location information of the network device, location information of the terminal device, and location information of the center of the serving cell corresponding to the terminal device, a height angle of the network device relative to the center of the serving cell corresponding to the terminal device at the moment.

For a specific description of determining, by the terminal device, the height angle of the network device relative to the center of the serving cell corresponding to the terminal device, refer to the description of determining, by the terminal device, the height angle of the network device relative to the center of the serving cell corresponding to the terminal device in step 301. Details are not described again.

Step 502. The terminal device determines an intra-frequency and/or inter-frequency connected-state measurement threshold based on the transmission parameter.

The terminal device may determine, based on the height angle of the network device relative to the center of the serving cell, an intra-frequency and/or inter-frequency connected-state measurement threshold corresponding to a current height angle from a prestored mapping relationship between a height angle and an intra-frequency and/or inter-frequency connected-state measurement threshold.

For example, refer to the following Table 4. The terminal may pre-store a mapping relationship between a height angle range and an intra-frequency and/or inter-frequency connected-state measurement threshold.

TABLE 4

| | |
|---|---|
| Height angle range 1 | Intra-frequency and/or inter-frequency connected-state measurement threshold 1 |
| Height angle range 2 | Intra-frequency and/or inter-frequency connected-state measurement threshold 2 |
| Height angle range 3 | Intra-frequency and/or inter-frequency connected-state measurement threshold 3 |
| Height angle range 4 | Intra-frequency and/or inter-frequency connected-state measurement threshold 4 |

The mapping relationship between a height angle and an intra-frequency and/or inter-frequency connected-state measurement threshold may include a mapping relationship between a height angle and an intra-frequency connected-state measurement threshold and/or a mapping relationship between a height angle and an inter-frequency connected-state measurement threshold. For a neighboring cell that is configured as an intra-frequency cell of the serving cell, the terminal device may determine, based on the mapping relationship between a height angle and an intra-frequency connected-state measurement threshold, an intra-frequency connected-state measurement threshold corresponding to the current height angle. For a neighboring cell that is configured as an inter-frequency cell or an inter-RAT cell of the serving cell, the terminal device may determine, based on the mapping relationship between a height angle and an inter-frequency connected-state measurement threshold, an inter-frequency connected-state measurement threshold corresponding to the current height angle.

Optionally, the terminal device receives a mapping relationship that is between a height angle and an intra-frequency and/or inter-frequency connected-state measurement threshold and that is sent by the network device and stores the mapping relationship; or the terminal device determines a mapping relationship between a height angle and an intra-frequency and/or inter-frequency connected-state measurement threshold according to a preconfigured communication protocol and stores the mapping relationship.

The terminal may receive system information sent by the network device, and determine, based on the system information, the mapping relationship between a height angle and an intra-frequency and/or inter-frequency connected-state measurement threshold. The system information includes the mapping relationship between a height angle and an intra-frequency and/or inter-frequency connected-state measurement threshold.

It should be noted that the terminal device may determine the distance between the terminal device and the network device or a change trend of the distance based on the height angle. A smaller absolute value of a difference between a height angle value and 90 degrees indicates a shorter distance between the terminal device and the network device; and a larger absolute value of the difference between the height angle value and 90 degrees indicates a longer distance between the terminal device and the network device. A gradually decreasing absolute value of a difference between a height angle value and 90 degrees indicates that the distance between the terminal device and the network device becomes shorter; and a gradually increasing absolute value of the difference between the height angle value and 90 degrees indicates that the distance between the terminal device and the network device becomes longer.

For example, a height angle determined by the terminal device at a moment t1 is 60°, and a height angle determined at a moment t2 is 30°. Because $|60°-90°|<|30°-90°|$, the terminal device may determine that a distance between the terminal device and the network device at the moment t2 is longer than that at the moment t1, and a distance between the terminal device and the network device is increasingly long in a time period from t1 to t2.

For another example, a height angle determined by the terminal device at a moment t2 is 30°, and a height angle determined at a moment t3 is 90°. Because $|30°-90°|>|90°-90°|$, the terminal device may determine that a distance between the terminal device and the network device at the moment t3 is shorter than that at the moment t2, and a distance between the terminal device and the network device is increasingly short in a time period from t2 to t3.

When the absolute value of the difference between the height angle value and 90 degrees is smaller, the intra-frequency and/or inter-frequency connected-state measurement threshold may be set to a smaller value, to prevent the terminal device from triggering intra-frequency and/or inter-frequency connected-state measurement excessively early, thereby facilitating energy saving of the terminal device. When the absolute value of the difference between the height angle value and 90 degrees is larger, the intra-frequency and/or inter-frequency connected-state measurement threshold may be set to a larger value, to prevent the terminal device from triggering intra-frequency and/or inter-frequency connected-state measurement excessively late, thereby improving reliability of a communication system.

When the height angle value gradually approaches 90 degrees, that is, the absolute value of the difference between the height angle value and 90 degrees gradually becomes smaller, the intra-frequency and/or inter-frequency connected-state measurement threshold may be set to a smaller value, to prevent the terminal device from triggering intra-frequency and/or inter-frequency connected-state measurement excessively early, thereby facilitating energy saving of the terminal device. When the height angle value gradually differs 90 degrees, that is, the absolute value of the difference between the height angle value and 90 degrees gradually becomes larger, the intra-frequency and/or inter-frequency connected-state measurement threshold may be set to a higher value, to prevent the terminal device from triggering intra-frequency and/or inter-frequency connected-state measurement excessively late, thereby improving reliability of the communication system.

Step 503. The terminal device determines, based on the intra-frequency and/or inter-frequency connected-state measurement threshold, whether to trigger intra-frequency and/or inter-frequency connected-state measurement.

The terminal device may trigger intra-frequency and/or inter-frequency connected-state measurement when the channel status of the terminal device is lower than the intra-frequency and/or inter-frequency connected-state measurement threshold.

In a possible design, the terminal determines, based on the channel status and the intra-frequency connected-state measurement threshold, whether to trigger intra-frequency connected-state measurement.

The terminal device may measure a channel status of the terminal device in the serving cell, and trigger intra-frequency connected-state measurement when the channel status is less than the intra-frequency connected-state measurement threshold.

Optionally, when the terminal device is located at an edge of the serving cell, the terminal device triggers intra-frequency connected-state measurement.

Optionally, when a distance between the network device and the center of the serving cell is the shortest, the terminal device determines, based on the channel status and the intra-frequency connected-state measurement threshold, whether to trigger intra-frequency and/or inter-frequency connected-state measurement.

In another possible design, the terminal device determines, based on the channel status and the intra-frequency and/or inter-frequency connected-state measurement threshold, whether to trigger intra-frequency and/or inter-frequency connected-state measurement, and reporting a determining result to the network device.

When the channel status is less than or equal to the intra-frequency and/or inter-frequency connected-state measurement threshold, the terminal device may trigger intra-frequency and/or inter-frequency connected-state measurement, and report the triggering of intra-frequency and/or inter-frequency connected-state measurement to the network device in an event form.

For example, the terminal device reports, to the network device, whether to trigger inter-frequency connected-state measurement. The terminal device may report, to the network device by using an event A1 and an event A2, whether to trigger inter-frequency connected-state measurement. Refer to Table 2. The event A1 is used to stop inter-frequency inter-RAT connected-state measurement, and is triggered when the channel status is higher than an inter-frequency connected-state measurement threshold. The A2 event is used to start inter-frequency inter-RAT connected-state measurement, and is triggered when the channel status is lower than the inter-frequency connected-state measurement threshold.

Based on the method shown in FIG. 5a, the terminal device may dynamically determine the intra-frequency and/or inter-frequency connected-state measurement threshold based on the location information of the network device, to improve flexibility of determining the intra-frequency and/or inter-frequency connected-state measurement threshold. The terminal device properly uses different thresholds when the network device is in different locations, so that the terminal device can be prevented from triggering intra-frequency and/or inter-frequency connected-state measurement excessively early or excessively late, thereby improving reliability of the communication system and facilitating energy saving of the terminal device.

In the method shown in FIG. 5a, the terminal device may determine, based on the channel status of the terminal device and the intra-frequency and/or inter-frequency connected-state measurement threshold, whether to trigger intra-frequency and/or inter-frequency connected-state measurement according to step 503. Alternatively, the terminal device may determine, based on the following step 504 and indication information sent by the network device based on a location of the terminal device in the serving cell, whether to trigger intra-frequency and/or inter-frequency connected-state measurement.

Step 504. The terminal device determines, based on the indication information sent by the network device based on the location of the terminal device in the serving cell, whether to trigger intra-frequency and/or inter-frequency connected-state measurement.

When the terminal device is located at the edge of the serving cell, the network device may send, to the terminal device, the indication information for triggering intra-frequency and/or inter-frequency connected-state measurement.

For example, the terminal device may send first information to the network device, receive the indication information sent by the network device, and determine, based on the indication information, whether to trigger intra-frequency and/or inter-frequency connected-state measurement.

The first information indicates the location of the terminal device in the serving cell, and the indication information indicates whether to trigger intra-frequency and/or inter-frequency connected-state measurement.

Optionally, the terminal device includes the location information of the terminal device in the first information and sends the first information to the network device. The network device determines, based on the location information of the terminal device, the location information of the center of the serving cell, and a coverage radius of the serving cell, whether the terminal device is located at the edge of the serving cell. When it is determined that the terminal device is located at the edge of the serving cell, the network device sends, to the terminal device, the indication information indicating the terminal device to trigger intra-frequency and/or inter-frequency connected-state measurement.

For a specific process of determining, by the network device, whether the terminal device is located at the edge of the serving cell, refer to the specific process of determining, by the terminal device, whether the terminal device is located at the edge of the serving cell in step 304. Details are not described again.

Optionally, the terminal device includes the location of the terminal device in the serving cell in the first information and sends the first information to the network device. When the first information indicates that the terminal device is located at the edge of the serving cell, the network device sends, to the terminal device, the indication information indicating the terminal device to trigger intra-frequency and/or inter-frequency connected-state measurement.

For a specific process in which the terminal device determines the location of the terminal device in the serving cell, refer to step 304. Details are not described again.

It should be noted that the terminal device may send the first information to the network device in a form of a reporting event.

For example, the terminal device reports the location of the terminal device in the serving cell to the network device. The reporting event may include one or more of the following events:

Event 1: indicates that the distance between the terminal device and the center of the serving cell is less than a preset value. The network device may determine, based on the event 1, that the terminal device is located in the center of the serving cell.

Event 2: indicates that the distance between the terminal device and the center of the serving cell is greater than a preset value. The network device may determine, based on the event 2, that the terminal device is located at the edge of the serving cell.

Event 3: indicates that an absolute value of a difference between the distance between the terminal device and the center of the serving cell and the preset value is greater than a preset offset value. The network device may determine, based on the event 3, that the terminal device is already far away from the cell center.

It should be noted that the reporting event may alternatively be another event that indicates the location of the terminal device in the serving cell. This is not limited.

Based on step 504, the terminal device may trigger intra-frequency and/or inter-frequency connected-state measurement when the terminal device is located at the edge of the serving cell, to avoid unnecessary power consumption caused because no suitable neighboring cell is found when the terminal device starts intra-frequency and/or inter-frequency connected-state measurement at the center of the serving cell, thereby facilitating energy saving of the terminal device. In addition, a quantity of times that the terminal device triggers intra-frequency and/or inter-frequency connected-state measurement can be reduced, thereby improving flexibility of intra-frequency and/or inter-frequency connected-state measurement, and improving efficiency of intra-frequency and/or inter-frequency connected-state measurement.

It should be noted that, the terminal device may determine, based on one or more of step 503 or step 504, whether to trigger intra-frequency and/or inter-frequency connected-state measurement. This is not limited.

When the terminal device determines, according to step 503 and step 504, whether to trigger intra-frequency and/or inter-frequency connected-state measurement, an execution sequence of step 503 and step 504 is not limited. Step 503 may be performed before step 504, step 504 may be performed before step 503, or the two steps may be performed at the same time. This is not limited.

Based on the method shown in FIG. 5a, as shown in FIG. 5b, step 501 and step 502 may be alternatively replaced with step 501a and step 502a. The terminal device may determine the intra-frequency and/or inter-frequency connected-state measurement threshold based on the channel status of the terminal device in the serving cell according to step 501a and step 502a.

FIG. 5b is a flowchart of a transmission parameter obtaining method according to an embodiment of this application. As shown in FIG. 5b, when a terminal device is in a connected state, the method may include the following steps.

Step 501a. The terminal device measures a channel status of the terminal device in a serving cell.

For a description of step 501a, refer to the specific description of step 301a. Details are not described again.

Step 502a. The terminal device determines an intra-frequency and/or inter-frequency connected-state measurement threshold based on the channel status.

The terminal device may determine the intra-frequency and/or inter-frequency connected-state measurement threshold based on a variation of the channel status in a unit time.

For example, when the variation of the channel status in the unit time is greater than or equal to a fifth value, the terminal device may use a ninth threshold as the intra-frequency and/or inter-frequency connected-state measurement threshold; or when the variation of the channel status in the unit time is less than the fifth value, the terminal device may use a tenth threshold as the intra-frequency and/or inter-frequency connected-state measurement threshold, where the ninth threshold is less than the tenth threshold.

For a description of the unit time and a description of the variation of the channel status in the unit time, refer to the description of the unit time and the variation of the channel status in the unit time in step 302*a*. Details are not described again.

The terminal device may determine the variation of the channel status in the unit time based on the channel status obtained by the terminal device through measurement in step 501*a*.

The terminal device may determine, based on the variation of the channel status in the unit time and the fifth value, whether the channel status of the terminal device becomes better or poorer. When the variation of the channel status in the unit time is greater than or equal to the fifth value, it may be determined that the channel status of the terminal device becomes better. When the variation of the channel status in the unit time is less than the fifth value, it may be determined that the channel status of the terminal device becomes poorer. That the channel status of the terminal device becomes better may also be understood as that a distance between the terminal device and a network device becomes shorter. That the channel status of the terminal device becomes poorer may also be understood as that the distance between the terminal device and the network device becomes longer. This is not limited. The fifth value may be 0.

For example, the fifth value is 0, and RSRP is used to represent the channel status of the terminal device. Assuming that the terminal device determines that the RSRP is 10 dBm at a moment t1, and determines that the RSRP is 8 dBm at a moment t2, the terminal device may use 8 dBm−10 dBm=−2 dBm as a variation of the channel status in a unit time t2−t1. Because −2 dBm is less than 0, it may be determined that the channel status becomes poorer in a time period from t1 to t2.

For another example, the fifth value is 0, and RSRP is used to represent the channel status of the terminal device. Assuming that the terminal device determines that the RSRP is 8 dBm at a moment t2, and determines that the RSRP is 15 dBm at a moment t3, the terminal device may use 15 dBm−8 dBm=7 dBm as a variation of the channel status in a unit time t3−t2. Because 7 dBm is greater than 0, it may be determined that the channel status becomes better in a time period from t2 to t3.

Optionally, the fifth value is greater than 0. When the fifth value is greater than 0, if the variation of the channel status in the unit time is greater than the fifth value, it may be determined that the channel status becomes better.

For example, the fifth value is 2 dBm, and RSRP is used to represent the channel status of the terminal device. Assuming that the terminal device determines that the RSRP is 7 dBm at a moment t1, and determines that the RSRP is 13 dBm at a moment t2, the terminal device may use 13 dBm−7 dBm=6 dBm as a variation of the channel status in a unit time t2−t1. Because 6 dBm is greater than 2 dBm, it may be determined that the channel status becomes better in a time period from t1 to t2.

Optionally, the fifth value is less than 0. When the fifth value is less than 0, if the variation of the channel status in the unit time is less than or equal to the fifth value, it may be determined that the channel status becomes poorer.

For example, the fifth value is −2 dBm, and RSRP is used to represent the channel status of the terminal device. Assuming that the terminal device determines that the RSRP is 7 dBm at a moment t1, and determines that the RSRP is 4 dBm at a moment t2, the terminal device may use 4 dBm−7 dBm=−3 dBm as a variation of the channel status in a unit time t2−t1. Because −3 dBm is less than −2 dBm, it may be determined that the channel status becomes poorer in a time period from t1 to t2.

It should be noted that, when the unit time is fixed, a larger absolute value of the variation of the channel status in the unit time indicates a faster change speed of the channel status.

For a manner in which the terminal device determines the ninth threshold and the tenth threshold, refer to the manner in which the terminal device determines the first threshold and the second threshold in step 302. Details are not described again.

Based on the method shown in FIG. 5*b*, the terminal device may use, when the channel status of the terminal device becomes better, the ninth threshold that is smaller as the intra-frequency and/or inter-frequency connected-state measurement threshold, to prevent the terminal device from triggering intra-frequency and/or inter-frequency connected-state measurement excessively early, thereby facilitating energy saving of the terminal device. When the channel status of the terminal device becomes poorer, the tenth threshold that is larger is used as the intra-frequency and/or inter-frequency connected-state measurement threshold, to prevent the terminal device from triggering intra-frequency and/or inter-frequency connected-state measurement excessively late, thereby improving reliability of the communication system.

Based on the methods shown in FIG. 3*a* to FIG. 5*a*, after determining the intra-frequency and/or inter-frequency cell-reselection measurement threshold, the radio link failure threshold, or the intra-frequency and/or inter-frequency connected-state measurement threshold, the terminal device may periodically update the intra-frequency and/or inter-frequency cell-reselection measurement threshold, the radio link failure threshold, or the intra-frequency and/or inter-frequency connected-state measurement threshold, to improve accuracy of the intra-frequency and/or inter-frequency cell-reselection measurement threshold, the radio link failure threshold, or the intra-frequency and/or inter-frequency connected-state measurement threshold. In this way, accuracy of a cell reselection procedure, a radio link failure recovery procedure, or a cell handover procedure is improved, and reliability of a communication system is improved.

For example, the terminal device may periodically update the intra-frequency and/or inter-frequency cell-reselection measurement threshold, the radio link failure threshold, or the intra-frequency and/or inter-frequency connected-state measurement threshold by using a timer.

The terminal device may set a first timer for the intra-frequency and/or inter-frequency cell-reselection measurement threshold. After the first timer expires, the terminal device re-determines the intra-frequency and/or inter-frequency cell-reselection measurement threshold in the manner of determining the intra-frequency and/or inter-frequency cell-reselection measurement threshold in FIG. 3*a*. Alternatively, the terminal device may set a second timer for the radio link failure threshold. After the second timer expires, the terminal device re-determines the radio link failure threshold in the manner of determining the radio link failure threshold in FIG. 4*a*. Alternatively, the terminal device may set a third timer for the intra-frequency and/or inter-frequency connected-state measurement threshold. After the third timer expires, the terminal device re-determines the intra-frequency and/or inter-frequency connected-state measurement threshold in the manner of determining the intra-frequency and/or inter-frequency connected-state measurement threshold in FIG. 5*a*.

The foregoing mainly describes the solutions provided in embodiments of this application from a perspective of interaction between the devices. It may be understood that to implement the foregoing functions, the devices include hardware structures and/or software modules corresponding to the functions. A person of ordinary skill in the art should easily be aware that, in combination with algorithms and steps in the examples described in embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, functional modules of each device may be obtained through division according to the foregoing method example. For example, the functional modules may be obtained through division corresponding to various functions, or two or more functions may be integrated into one processing module. The integrated module may be implemented in a form of hardware, or may be implemented in a form of a software functional module. It should be noted that, in embodiments of this application, module division is an example, and is merely a logical function division. In actual implementation, another division manner may be used.

Figure 6:
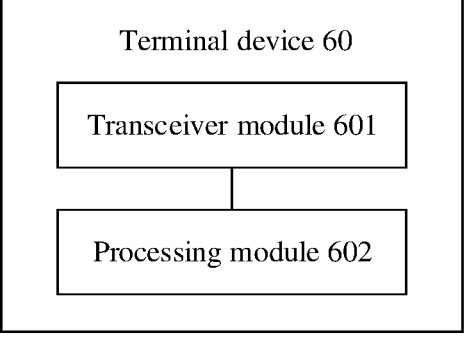
FIG. 6 is a schematic diagram of a structure of a terminal device according to an embodiment of this application.

When each function module is obtained through division based on each corresponding function, FIG. 6 shows a terminal device. The terminal device 60 may include a transceiver module 601 and a processing module 602. For example, the terminal device 60 may be a terminal device, or may be a chip used in the terminal device or another combined device or component that has a function of the terminal device. When the terminal device 60 is the terminal device, the transceiver module 601 may be a transceiver, where the transceiver may include an antenna, a radio frequency circuit, and the like; and the processing module 602 may be a processor (or a processing circuit), for example, a baseband processor, where the baseband processor may include one or more CPUs. When the terminal device 60 is the component that has the function of the terminal device, the transceiver module 601 may be a radio frequency unit, and the processing module 602 may be a processor (or a processing circuit), for example, a baseband processor. When the terminal device 60 is a chip system, the transceiver module 601 may be an input/output interface of a chip (for example, a baseband chip), and the processing module 602 may be a processor (or a processing circuit) of the chip system, and may include one or more central processing units. It should be understood that the transceiver module 601 in this embodiment of this application may be implemented by a transceiver or a transceiver-related circuit component, and the processing module 602 may be implemented by a processor or a processor-related circuit component (or referred to as a processing circuit).

For example, the transceiver module 601 may be configured to perform all sending and receiving operations performed by the terminal device in the embodiments shown in FIG. 3*a* to FIG. 5*a*, and/or configured to support another process of the technology described in this specification. The processing module 602 may be configured to perform all operations other than the receiving and sending operations performed by the terminal device in the embodiments shown in FIG. 3*a* to FIG. 5*a*, and/or configured to support another process of the technology described in this specification.

The transceiver module 601 is configured to obtain a transmission parameter of a network device, where the transmission parameter indicates location information of the network device.

The processing module 602 configured to determine an intra-frequency and/or inter-frequency cell-reselection measurement threshold based on the transmission parameter.

Alternatively, the processing module 602 is configured to determine a radio link failure threshold based on the transmission parameter.

Alternatively, the processing module 602 configured to determine an intra-frequency and/or inter-frequency connected-state measurement threshold based on the transmission parameter.

In a possible design, the transmission parameter includes a distance between the terminal device and the network device, and the processing module 602 is configured to: when a variation of the distance in a unit time is less than or equal to a first value, use, by the processing module 602, a first threshold as the intra-frequency and/or inter-frequency cell-reselection measurement threshold; or when the variation of the distance in the unit time is greater than the first value, use, by the processing module 602, a second threshold as the intra-frequency and/or inter-frequency cell-reselection measurement threshold, where the first threshold is less than the second threshold.

In a possible design, the transmission parameter includes a height angle of the network device relative to a center of a serving cell corresponding to the terminal device, and the processing module 602 is configured to determine, based on the height angle from a mapping relationship between a height angle and an intra-frequency and/or inter-frequency cell-reselection measurement threshold, an intra-frequency and/or inter-frequency cell-reselection measurement threshold corresponding to the height angle.

In a possible design, the transmission parameter includes the distance between the terminal device and the network device, and the processing module 602 is configured to: when the variation of the distance in the unit time is less than or equal to a second value, use, by the processing module 602, a third threshold as the radio link failure threshold; or when the variation of the distance in the unit time is greater than the second value, use, by the processing module 602, a fourth threshold as the radio link failure threshold, where the third threshold is greater than the fourth threshold.

In a possible design, when the transmission parameter includes the height angle of the network device relative to the center of the serving cell corresponding to the terminal device, the processing module 602 is configured to: determine, based on the height angle from a mapping relationship between a height angle and an intra-frequency and/or inter-frequency connected-state measurement threshold, an intra-frequency and/or inter-frequency connected-state measurement threshold corresponding to the height angle.

In a possible design, the processing module 602 is further configured to periodically update the intra-frequency and/or inter-frequency cell-reselection measurement threshold, the radio link failure threshold, or the intra-frequency and/or inter-frequency connected-state measurement threshold.

In a possible design, the processing module 602 is further configured to: when determining that the terminal device is located at an edge of the serving cell, perform intra-frequency and/or inter-frequency cell-reselection measurement, or perform intra-frequency connected-state measurement.

In a possible design, the processing module 602 is further configured to: when determining that a distance between the network device and the center of the serving cell is the shortest, perform intra-frequency and/or inter-frequency cell-reselection measurement based on the intra-frequency and/or inter-frequency cell-reselection measurement threshold.

In a possible design, the processing module 602 is further configured to: determine, based on indication information sent by the network device based on a location of the terminal device in the serving cell, whether to trigger intra-frequency and/or inter-frequency connected-state measurement; and when the indication information indicates to trigger intra-frequency and/or inter-frequency connected-state measurement, perform intra-frequency and/or inter-frequency connected-state measurement based on the intra-frequency and/or inter-frequency connected-state measurement threshold.

In another possible implementation, the processing module 602 in the terminal device 60 shown in FIG. 6 may be further configured to: the processing module 602 is further configured to obtain a channel status obtained by the terminal device through measurement in a corresponding serving cell. The processing module 602 is further configured to determine an intra-frequency and/or inter-frequency cell-reselection measurement threshold based on the channel status. Alternatively, the processing module 602 is further configured to determine a radio link failure threshold based on the channel status; or the processing module 602 is further configured to determine an intra-frequency and/or inter-frequency connected-state measurement threshold based on the channel status.

In a possible design, the processing module 602 is configured to: when a variation of the channel status in a unit time is greater than or equal to a third value, use, by the processing module 602, a fifth threshold as the intra-frequency and/or inter-frequency cell-reselection measurement threshold; or when the variation of the channel status in the unit time is less than the third value, using, by the processing module 602, a sixth threshold as the intra-frequency and/or inter-frequency cell-reselection measurement threshold, where the fifth threshold is less than the sixth threshold.

In a possible design, the processing module 602 is configured to: when the variation of the channel status in the unit time is greater than or equal to a fourth value, use, by the processing module 602, a seventh threshold as the radio link failure threshold; or when the variation of the channel status in the unit time is less than the fourth value, use, by the processing module 602, an eighth threshold as the radio link failure threshold, where the seventh threshold is greater than the eighth threshold.

In a possible design, the processing module 602 is configured to: when the variation of the channel status in the unit time is greater than or equal to a fifth value, use, by the processing module, a ninth threshold as the intra-frequency and/or inter-frequency connected-state measurement threshold; or when the variation of the channel status in the unit time is less than the fifth value, using, by the processing module, a tenth threshold as the intra-frequency and/or inter-frequency connected-state measurement threshold, where the ninth threshold is less than the tenth threshold.

In still another possible implementation, the transceiver module 601 in FIG. 6 may be replaced with a transceiver, functions of the transceiver module 601 may be integrated into the transceiver, the processing module 602 may be replaced with a processor, and functions of the processing module 602 may be integrated into the processor. Further, the terminal device 60 shown in FIG. 6 may further include a memory. When the transceiver module 601 is replaced with a transceiver and the processing module 602 is replaced with a processor, the terminal device 60 in this embodiment of this application may be the communication apparatus shown in FIG. 2.

Figure 7:
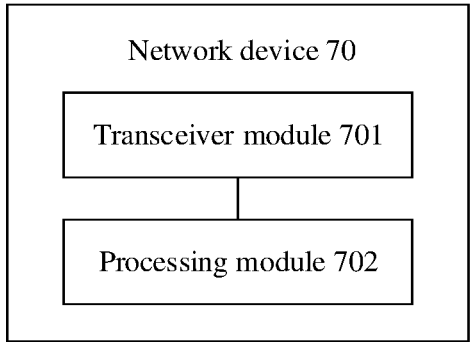
FIG. 7 is a schematic diagram of a structure of a network device according to an embodiment of this application.

When each function module is obtained through division based on each corresponding function, FIG. 7 shows a network device. The network device 70 may include a transceiver module 701 and a processing module 702. For example, the network device 70 may be a network device, or may be a chip used in the network device or another combined device or component that has a function of the network device. When the network device 70 is the network device, the transceiver module 701 may be a transceiver, where the transceiver may include an antenna, a radio frequency circuit, and the like; and the processing module 702 may be a processor (or a processing circuit), for example, a baseband processor, where the baseband processor may include one or more CPUs. When the network device 70 is a component having a function of the foregoing network device, the transceiver module 701 may be a radio frequency unit, and the processing module 702 may be a processor (or a processing circuit), for example, a baseband processor. When the network device 70 is a chip system, the transceiver module 701 may be an input/output interface of a chip (for example, a baseband chip), and the processing module 702 may be a processor (or a processing circuit) of the chip system, and may include one or more central processing units. It should be understood that the transceiver module 701 in this embodiment of this application may be implemented by a transceiver or a transceiver-related circuit component, and the processing module 702 may be implemented by a processor or a processor-related circuit component (or referred to as a processing circuit).

For example, the transceiver module 701 may be configured to perform all sending and receiving operations performed by the network device in the embodiments shown in FIG. 3*a* to FIG. 5*a*, and/or configured to support another process of the technology described in this specification. The processing module 710 may be configured to perform all operations other than the receiving and sending operations performed by the network device in the embodiments shown in FIG. 3*a* to FIG. 5*a*, and/or configured to support another process of the technology described in this specification.

The transceiver module 701 is configured to send, to a terminal device, a transmission parameter indicating location information of the network device, so that the terminal device determines an intra-frequency and/or inter-frequency cell-reselection measurement threshold based on the transmission parameter, determines a radio link failure threshold based on the transmission parameter, or determines an intra-frequency and/or inter-frequency connected-state measurement threshold based on the transmission parameter.

In a possible design, the transmission parameter includes a distance between the terminal device and the network device. In this case, the terminal device uses a first threshold as the intra-frequency and/or inter-frequency cell-reselection measurement threshold when a variation of the distance in a unit time is less than or equal to a first value; or uses a second threshold as the intra-frequency and/or inter-frequency cell-reselection measurement threshold when the variation of the distance in the unit time is greater than the first value, where the first threshold is less than the second threshold.

In a possible design, the transmission parameter includes a height angle of the network device relative to a center of a serving cell corresponding to the terminal device. In this case, the terminal device determines, based on the height angle from a mapping relationship between a height angle and an intra-frequency and/or inter-frequency cell-reselection measurement threshold, an intra-frequency and/or inter-frequency cell-reselection measurement threshold corresponding to the height angle.

In a possible design, the transmission parameter includes the distance between the terminal device and the network device. In this case, the terminal device uses a third threshold as the radio link failure threshold when the variation of the distance in the unit time is less than or equal to a second value; or uses a fourth threshold as the radio link failure threshold when the variation of the distance in the unit time is greater than the second value, where the third threshold is greater than the fourth threshold.

In a possible design, the transmission parameter includes a height angle of the network device relative to a center of a serving cell corresponding to the terminal device. In this case, the terminal device determines, based on the height angle from a mapping relationship between a height angle and an intra-frequency and/or inter-frequency connected-state measurement threshold, an intra-frequency and/or inter-frequency connected-state measurement threshold corresponding to the height angle.

In a possible design, the processing module 702 is configured to determine a location of the terminal device in the serving cell. The transceiver module 701 is further configured to send indication information to the terminal device based on the location of the terminal device in the serving cell, so that the terminal device determines, based on the indication information, whether to trigger intra-frequency and/or inter-frequency connected-state measurement. When the indication information indicates to trigger intra-frequency and/or inter-frequency connected-state measurement, the terminal device performs intra-frequency and/or inter-frequency connected-state measurement based on the intra-frequency and/or inter-frequency connected-state measurement threshold.

In still another possible implementation, the transceiver module 701 in FIG. 7 may be replaced with a transceiver, functions of the transceiver module 701 may be integrated into the transceiver, the processing module 702 may be replaced with a processor, and functions of the processing module 702 may be integrated into the processor. Further, the network device 70 shown in FIG. 7 may further include a memory. When the transceiver module 701 is replaced with a transceiver and the processing module 702 is replaced with a processor, the network device 70 in this embodiment of this application may be the communication apparatus shown in FIG. 2.

Embodiments of this application further provide a computer-readable storage medium. All or some of the processes in the foregoing method embodiments may be implemented by a computer program instructing related hardware. The program may be stored in the computer-readable storage medium. When the program is executed, the processes of the foregoing method embodiments may be included. The computer-readable storage medium may be an internal storage unit of the terminal (including a data transmit end and/or a data receive end) in any one of the foregoing embodiments, for example, a hard disk drive or a memory of the terminal. Alternatively, the computer-readable storage medium may be an external storage device of the terminal, for example, a plug-in hard disk, a smart media card (smart media card, SMC), a secure digital (secure digital, SD) card, a flash card (flash card), or the like that are configured on the terminal. Further, the computer-readable storage medium may alternatively include both of the internal storage unit of the terminal and the external storage device. The computer-readable storage medium is configured to store the computer program and other programs and data that are required by the terminal. The computer-readable storage medium may be further configured to temporarily store data that has been output or is to be output.

It should be noted that, in the specification, claims, and accompanying drawings of this application, the terms "first", "second", and the like are intended to distinguish between different objects but do not indicate a particular order. In addition, the terms "including" and "having" and any other variants thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

It should be understood that, in this application, "at least one (item)" means one or more, "a plurality of" means two or more, "at least two (items)" means two, three, or more, and "and/or" is used to describe an association relationship between associated objects, and indicates that there may be three relationships. For example, "A and/or B" may indicate that only A exists, only B exists, and both A and B exist, where A and B may be singular or plural. The character "/" generally indicates an "or" relationship between the associated objects. "At least one of the following items (pieces)" or a similar expression thereof refers to any combination of these items, including any combination of singular items (pieces) or plural items (pieces). For example, at least one of a, b, or c may indicate a, b, c, "a and b", "a and c", "b and c", or "a, b, and c", where a, b, and c may be singular or plural.

The foregoing descriptions about implementations allow a person skilled in the art to understand that, for the purpose of convenient and brief description, division of the foregoing functional modules is taken as an example for illustration. In actual application, the foregoing functions can be allocated to different modules and implemented according to a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely an example. For example, the module or division into the units is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of this application essentially, or the part contributing to the prior art, or all or some of the technical solutions may be implemented in the form of a software product. The software product is stored in a storage medium and includes several instructions for instructing a device (which may be a single-chip microcomputer, a chip or the like) or a processor (processor) to perform all or some of the steps of the methods described in embodiments of this application. The foregoing storage medium includes any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A transmission parameter obtaining method, comprising:

obtaining, by a terminal device, a transmission parameter of a network device, wherein the transmission parameter indicates a positional relationship between the terminal device and the network device; and determining, by the terminal device, at least one of an intra-frequency cell-reselection threshold or an inter-frequency cell-reselection threshold based on the transmission parameter;

determining, by the terminal device, a radio link failure threshold based on the transmission parameter; or determining, by the terminal device, at least one of an intra-frequency connected-state threshold or an inter-frequency connected-state threshold based on the transmission parameter, wherein the at least one of the intra-frequency cell-reselection threshold, the inter-frequency cell-reselection threshold, the radio link failure threshold, the intra-frequency connected-state threshold, or the an inter-frequency connected-state threshold corresponds to the positional relationship between the terminal device and the network device.

2. The transmission parameter obtaining method according to claim 1, wherein the positional relationship comprises a distance between the terminal device and the network device, and the determining, by the terminal device, the at least one of the intra-frequency cell-reselection threshold or the inter-frequency cell-reselection threshold based on the transmission parameter comprises:

in response to a variation of the distance in a unit time being less than or equal to a first value, using, by the terminal device, a first threshold as the at least one of the intra-frequency cell-reselection threshold or the inter-frequency cell-reselection threshold; or in response to the variation of the distance in the unit time being greater than the first value, using, by the terminal device, a second threshold as the at least one of the intra-frequency cell-reselection threshold or the inter-frequency cell-reselection threshold, wherein the first threshold is less than the second threshold.

3. The transmission parameter obtaining method to claim 1, wherein the positional relationship comprises a height angle of the network device relative to a center of a serving cell corresponding to the terminal device, and the determining, by the terminal device, the at least one of the intra-frequency cell-reselection threshold or the inter-frequency cell-reselection threshold based on the transmission parameter comprises:

determining, by the terminal device based on the height angle from a mapping relationship between the height angle and the at least one of the intra-frequency cell-reselection threshold or the inter-frequency cell-reselection threshold, at least one of an intra-frequency connected-state threshold or an inter-frequency cell-reselection threshold corresponding to the height angle.

4. The transmission parameter obtaining method according to claim 1, wherein the positional relationship comprises a distance between the terminal device and the network device, and the determining, by the terminal device, the radio link failure threshold based on the transmission parameter comprises:

in response to a variation of the distance in a unit time being less than or equal to a second value, using, by the terminal device, a third threshold as the radio link failure threshold; or in response to the variation of the distance in the unit time being greater than the second value, using, by the terminal device, a fourth threshold as the radio link failure threshold, wherein the third threshold is greater than the fourth threshold.

5. The transmission parameter obtaining method according to claim 1, wherein the positional relationship comprises a height angle of the network device relative to a center of a serving cell corresponding to the terminal device, and the determining, by the terminal device, the at least one of intra-frequency connected-state threshold or the inter-frequency connected-state threshold based on the transmission parameter comprises:

determining, by the terminal device based on the height angle from a mapping relationship between a height angle and the at least one of the intra-frequency connected-state threshold or the inter-frequency connected-state threshold, at least one of an intra-frequency connected-state threshold or an inter-frequency connected-state threshold corresponding to the height angle.

6. The transmission parameter obtaining method according to claim 1, further comprising:

periodically updating, by the terminal device, the at least one of the intra-frequency cell-reselection threshold or the inter-frequency cell-reselection threshold, the radio link failure threshold, or the at least one of the intra-frequency connected-state threshold or the inter-frequency connected-state threshold.

7. A communication apparatus, comprising:

one or more processors; and a non-transitory computer-readable storage medium storing instructions that, when executed by the one or more processors, cause the communication apparatus to:

obtain a transmission parameter of a network device, wherein the transmission parameter indicates a positional relationship between the communication apparatus and the network device; and determine at least one of an intra-frequency cell-reselection threshold or an inter-frequency cell-reselection threshold based on the transmission parameter;

determine a radio link failure threshold based on the transmission parameter; or determine at least one of an intra-frequency connected-state threshold or an inter-frequency connected-state threshold based on the transmission parameter, wherein the at least one of the intra-frequency cell-reselection threshold, the inter-frequency cell-reselection threshold, the radio link failure threshold, the intra-frequency connected-state threshold, or the an inter-frequency connected-state threshold corresponds to the positional relationship between the communication apparatus and the network device.

8. The communication apparatus according to claim 7, wherein the positional relationship comprises a distance between a terminal device and the network device, and the communication apparatus is caused to determine the at least one of the intra-frequency cell-reselection threshold or the inter-frequency cell-reselection threshold based on the transmission parameter by:

in response to a variation of the distance in a unit time being less than or equal to a first value, using a first threshold as the at least one of the intra-frequency cell-reselection threshold or the inter-frequency cell-reselection threshold; or in response to the variation of the distance in the unit time being greater than the first value, using a second threshold as the at least one of the intra-frequency cell-reselection threshold or the inter-frequency cell-reselection threshold, wherein the first threshold is less than the second threshold.

9. The communication apparatus according to claim 7, wherein the positional relationship comprises a height angle of the network device relative to a center of a serving cell corresponding to a terminal device, and the communication apparatus is caused to determine the at least one of the intra-frequency cell-reselection threshold or the inter-frequency cell-reselection threshold based on the transmission parameter by:

determine, based on the height angle from a mapping relationship between the height angle and the at least one of the intra-frequency cell-reselection threshold or the inter-frequency cell-reselection threshold, at least one of an intra-frequency connected-state threshold or an inter-frequency cell-reselection threshold corresponding to the height angle.

10. The communication apparatus according to claim 7, wherein the positional relationship comprises a distance between a terminal device and the network device, and the communication apparatus is caused to determine the radio link failure threshold based on the transmission parameter by:

in response to a variation of the distance in a unit time being less than or equal to a second value, using a third threshold as the radio link failure threshold; or in response to the variation of the distance in the unit time being greater than the second value, using a fourth threshold as the radio link failure threshold, wherein the third threshold is greater than the fourth threshold.

11. The communication apparatus according to claim 7, wherein when the positional relationship comprises a height angle of the network device relative to a center of a serving cell corresponding to a terminal device, and the communication apparatus is caused to determine the at least one of the intra-frequency connected-state threshold or the inter-frequency connected-state threshold based on the transmission parameter by:

determining, based on the height angle from a mapping relationship between a height angle and the at least one of the intra-frequency connected-state threshold or the inter-frequency connected-state threshold, at least one of an intra-frequency connected-state threshold or an inter-frequency connected-state threshold corresponding to the height angle.

12. The communication apparatus according to claim 7, wherein the communication apparatus is further caused to:

periodically update the at least one of the intra-frequency cell-reselection threshold or the inter-frequency cell-reselection threshold, the radio link failure threshold, or the at least one of intra-frequency connected-state threshold or the inter-frequency connected-state threshold.

13. A transmission parameter sending method, comprising:

sending, by a network device, a transmission parameter to a terminal device, wherein the transmission parameter indicates a positional relationship between the terminal device and the network device; and causing at least one of an intra-frequency cell-reselection threshold or an inter-frequency cell-reselection threshold to be determined based on the transmission parameter;

causing a radio link failure threshold to be determined based on the transmission parameter; or causing at least one of an intra-frequency connected-state threshold or an inter-frequency connected-state threshold to be determined based on the transmission parameter, wherein the at least one of the intra-frequency cell-reselection threshold, the inter-frequency cell-reselection threshold, the radio link failure threshold, the intra-frequency connected-state threshold, or the an inter-frequency connected-state threshold corresponds to the positional relationship between the terminal device and the network device.

14. The transmission parameter sending method according to claim 13, wherein the positional relationship comprises a distance between the terminal device and the network device; or the positional relationship comprises a height angle of the network device relative to a center of a serving cell corresponding to the terminal device.

15. A communication apparatus, comprising:

one or more processors; and a non-transitory computer-readable storage medium storing instructions that, when executed by the one or more processors, cause the communication apparatus to:

send a transmission parameter to a terminal device, wherein the transmission parameter indicates a positional relationship between the terminal device and a network device; and cause at least one of an intra-frequency cell-reselection threshold or an inter-frequency cell-reselection threshold to be determined based on the transmission parameter;

cause a radio link failure threshold to be determined based on the transmission parameter; or cause at least one of an intra-frequency connected-state threshold or an inter-frequency connected-state threshold to be determined based on the transmission parameter, wherein the at least one of the intra-frequency cell-reselection threshold, the inter-frequency cell-reselection threshold, the radio link failure threshold, the intra-frequency connected-state threshold, or the an inter-frequency connected-state threshold corresponds to the positional relationship between the terminal device and the network device.

16. The communication apparatus according to claim 15, wherein the positional relationship comprises a distance between the terminal device and the network device; or the positional relationship comprises a height angle of the network device relative to a center of a serving cell corresponding to the terminal device.

\* \* \* \* \*